United States Patent
Fletcher et al.

(10) Patent No.: US 9,599,234 B1
(45) Date of Patent: Mar. 21, 2017

(54) SPRUNG GATE VALVE

(71) Applicants: David E. Fletcher, Flint, MI (US);
Brian M. Graichen, Leonard, MI (US);
Matthew C. Gilmer, Whitmore Lake, MI (US); Keith Hampton, Ann Arbor, MI (US)

(72) Inventors: David E. Fletcher, Flint, MI (US);
Brian M. Graichen, Leonard, MI (US);
Matthew C. Gilmer, Whitmore Lake, MI (US); Keith Hampton, Ann Arbor, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 0 days.

(21) Appl. No.: 14/960,481

(22) Filed: Dec. 7, 2015

(51) Int. Cl.
*F16K 3/16* (2006.01)
*F16K 3/02* (2006.01)
(Continued)

(52) U.S. Cl.
CPC ....... *F16K 3/029* (2013.01); *F02M 35/10229* (2013.01); *F02M 35/10255* (2013.01);
(Continued)

(58) Field of Classification Search
CPC ...... F16K 3/029; F16K 3/0227; F16K 3/0668; F16K 3/16; F16K 3/1221; Y10T 137/0514;
(Continued)

(56) References Cited

U.S. PATENT DOCUMENTS 2,660,191 A * 11/1953 Volpin .................... F16K 27/08
104/32.1
2,705,019 A * 3/1955 Volpin .................. F16K 27/044
137/315.3
(Continued)

FOREIGN PATENT DOCUMENTS

| GB | 867647 | 5/1961 |
| GB | 923730 | 4/1963 |
| JP | H-8285096 | 11/1996 |

OTHER PUBLICATIONS

"C-G4 Through Conduit Gate Valves"; Pipeline valves and actuated safety solutions for the transportation of hydrocarbons; CORT; http://www.robertcort.co.uk/pipeline-valves-acuators/g4-gate-valves (published at least as early as Jun. 22, 2011).
(Continued)

*Primary Examiner* — Mary McManmon
*Assistant Examiner* — Richard K Durden
(74) *Attorney, Agent, or Firm* — Thompson Hine LLP

(57) ABSTRACT

A sprung gate for a valve having an endless elastic band sandwiched between a first gate member that defines a first opening therethrough, which includes a flange oriented parallel to and extending in a direction opposite to a flow direction through the sprung gate, and a second gate member that defines a second opening therethrough, which has an elongate throat extending therefrom toward the first gate member. The endless elastic band spaces the first gate member a distance apart from the second gate member and the terminus of the elongate throat is seated within the flange of the first gate member to define a continuous passage through the sprung gate.

19 Claims, 17 Drawing Sheets

(51) Int. Cl.
*F02M 35/10* (2006.01)
*F16K 3/18* (2006.01)
*F16K 3/314* (2006.01)

(52) U.S. Cl.
CPC .............. *F16K 3/0227* (2013.01); *F16K 3/18* (2013.01); *F16K 3/16* (2013.01); *F16K 3/314* (2013.01)

(58) Field of Classification Search
CPC ......... Y10T 137/6072; Y10T 137/6075; Y10T 137/6079; Y10T 137/6082
USPC ... 137/15.23, 315.29, 315.3, 315.31, 315.32; 251/175, 193, 195, 196, 326, 327, 329
See application file for complete search history.

(56) References Cited

U.S. PATENT DOCUMENTS

| | | | |
|---|---|---|---|
| 3,559,947 A | 2/1971 | Sette | |
| 3,768,774 A | 10/1973 | Baugh | |
| 4,095,612 A | 6/1978 | Hardcastle | |
| 4,157,169 A * | 6/1979 | Norman | F16K 51/02 251/167 |
| 4,603,842 A | 8/1986 | King | |
| 4,671,312 A * | 6/1987 | Bruton | E21B 34/02 137/315.29 |
| 5,020,776 A | 6/1991 | Owens et al. | |
| 5,195,722 A | 3/1993 | Bedner | |
| 5,271,426 A | 12/1993 | Clarkson et al. | |
| 5,582,200 A | 12/1996 | Kimpel et al. | |
| 6,158,718 A | 12/2000 | Lang et al. | |
| 7,537,198 B2 | 5/2009 | Petersen et al. | |
| 7,896,313 B2 | 3/2011 | Ishigaki | |
| 8,403,298 B2 | 3/2013 | Nguyen | |
| 2002/0066877 A1* | 6/2002 | Nakagawa | F16K 3/188 251/193 |
| 2012/0256111 A1 | 10/2012 | Hoang et al. | |
| 2012/0313023 A1* | 12/2012 | Brock | F16K 3/186 251/197 |
| 2014/0197345 A1* | 7/2014 | Graichen | F16K 31/084 251/324 |
| 2014/0353534 A1 | 12/2014 | Graichen et al. | |
| 2015/0060709 A1 | 3/2015 | Fletcher et al. | |
| 2015/0090355 A1* | 4/2015 | Fletcher | F16K 31/0668 137/630.12 |
| 2015/0128573 A1* | 5/2015 | Fletcher | F01N 3/2066 60/284 |

OTHER PUBLICATIONS

"Parallel Disc Gate Valve Features—Valve Knowledge"; Ningbo Valve Factory—China Valve Expert & Supplier; http://www.valve-check.com/news/Parallel-Disc-Gate-Valve-Features-84.html (published at least as early as Mar. 13, 2014).

"Classification of Gate Valve"; http://www.1gatevalve.com/technology-2.html (published at least as early as Nov. 18, 2010).

* cited by examiner

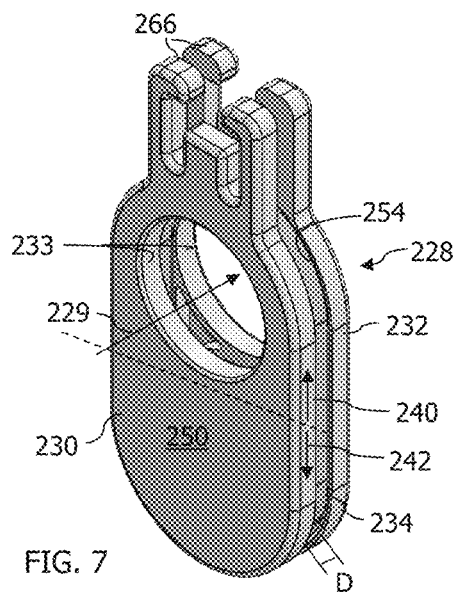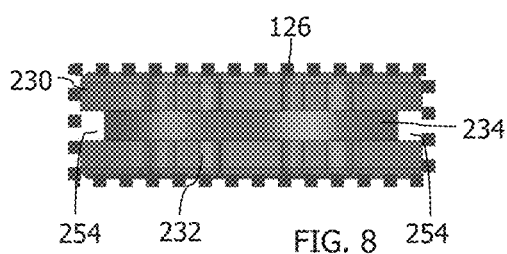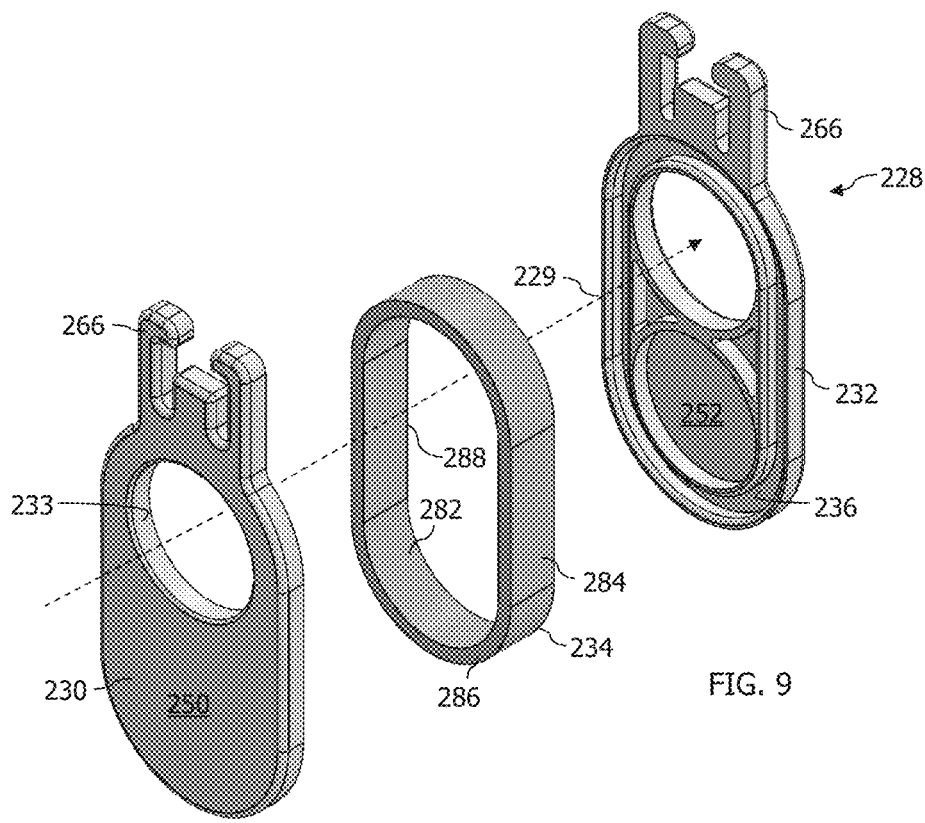
FIG. 7
FIG. 8
FIG. 9

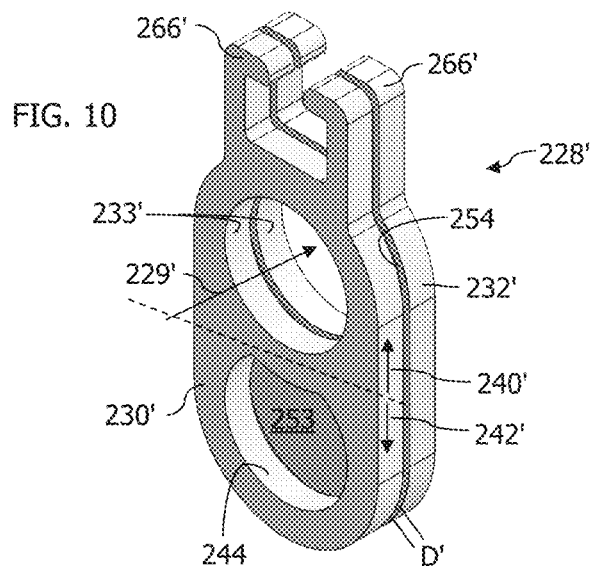
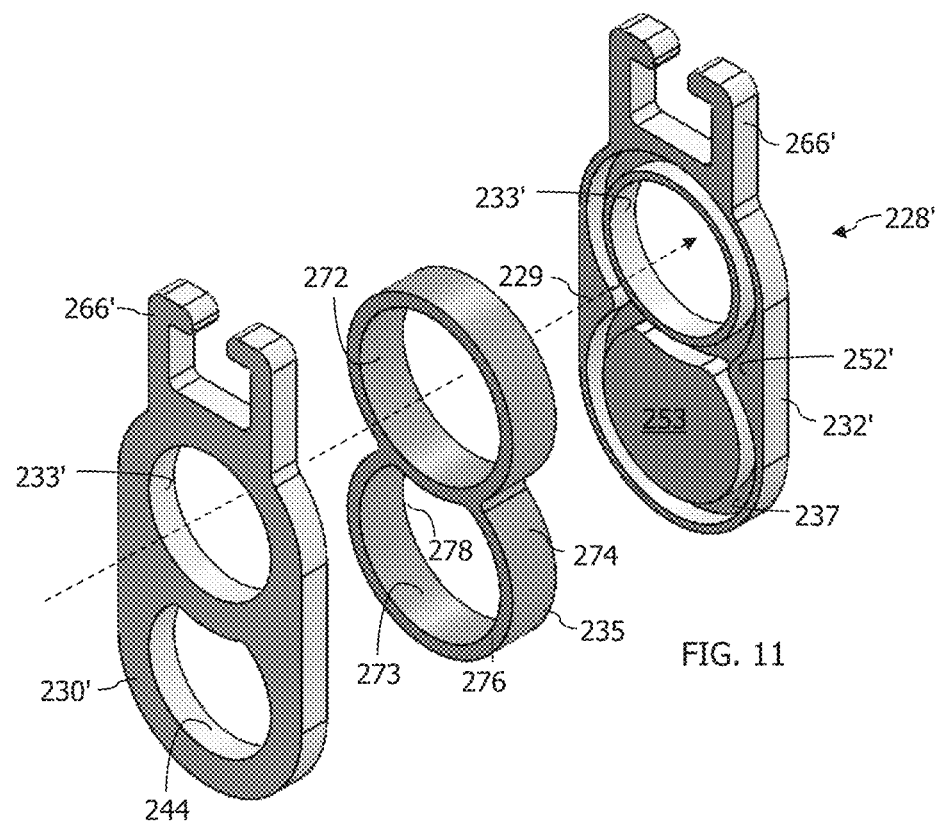

SPRUNG GATE VALVE

TECHNICAL FIELD

This application relates to sprung gate valves and, more particularly, to a solenoid-powered sprung gate valve adapted to selectively control the flow of air or other fluids with reduced solenoid operating force, thereby enabling the solenoid actuator to be smaller than previously envisioned.

BACKGROUND

In automotive engines, vacuum developed within the intake manifold or produced by a vacuum generator (e.g., a vacuum pump, aspirator, ejector, or evacuator) is routinely used to power pneumatic accessories such as power brake boosters. On/off operation of the generator and/or accessory is frequently controlled by a gate valve in which a rigid gate is deployed across a conduit to stop the flow of a fluid (in this exemplary application, air) through the valve. Within automated or "commanded" valves, the gate is typically actuated by a solenoid and opened or closed in response to an electrical current applied to the solenoid coil. These solenoid-powered gate valves also tend to include a coil spring, diaphragm, or other biasing element which biases the gate towards an unpowered, 'normally open' or 'normally closed' position. Since the biasing force must overcome frictional forces resisting movement of the gate in order to return it to its normal position, and since the solenoid mechanism must overcome both these same frictional forces and any biasing force in order to move the gate to an actively-powered position, frictional forces tend to dictate much of the required solenoid operating force, i.e., the more friction, a larger/more powerful solenoid is required.

Gate valves must satisfy a number of performance requirements, including offering minimal flow resistance when in the flow position, minimal leakage around the gate when in the no flow position, and to not offer a means for the debris entrained in the gas flowing into the valve to reside between any moving and stationary surfaces. An improvement would offer minimal impact of the flow capacity of the gate and reduce debris ingress. There is a need for a gate design that can minimize these undesirable effects.

SUMMARY

Disclosed herein is a solenoid-powered gate valve that provides reliable, high quality seal with a reduced operating force requirement. The valve includes a solenoid coil and armature connected to a valve mechanism, with the valve mechanism including a conduit having a connection opening, an oppositely-disposed pocket, and a sprung gate assembly linearly movable within the pocket and through a connection opening, if needed for length of travel. The sprung gate assembly includes a first gate member, a second gate member opposing the first gate member, and an endless elastic band retained between the first and second gate members, with the first and second gate members being mechanically coupled to the armature for reciprocating linear movement. In one embodiment, this mechanical coupling includes a connecting member protruding from a trailing end of both the first gate member and the second gate member, which collectively define a multi-part socket that allows the sprung gate to rotate 360 degrees or more about its central longitudinal axis relative to the armature. The multi-part socket includes a generally annular opening most distal the trailing end and a larger chamber more proximate the trailing end relative to the generally annular opening.

The first and second gate members are mechanically fastened to one another for ease of assembly, in particular insertion into a pocket in the conduit. The mechanical fastening is achieved by a fastener of the first gate member being received by a fastener receiving member of the second gate member thereby securing the first and second gate members together. The fastener may be a latch and the fastener receiving member may be a detent. The first endless elastic band is generally figure 8-shaped seated within a track in each of the first and second gate members and may be a bellowed elastic band, with the bellows oriented transverse to the direction of flow therethrough. The first gate member may also define a second opening therethrough in a closed position portion thereof, while the second gate member, in a closed position portion thereof, includes a plug projecting from its inner surface toward the second opening in the first gate member.

The first gate member defines a first opening therethrough that has a flange oriented parallel to and extending in a direction opposite to a flow direction through the sprung gate. The second gate member defines a second opening therethrough that has an elongate throat extending therefrom toward the first gate member. A terminus of the elongate throat is seated within the flange of the first gate member, thereby defining a continuous passage through the sprung gate. The endless elastic band is sandwiched between the first and second gate members with an open space receiving the continuous passage defined by the elongate throat and the annular flange. The endless elastic band also spaces the first gate member a distance apart from the second gate member.

The elongate throat defines a gradually, continuously tapering interior passageway. The elongate throat has a length smaller than the distance from the exterior surface of the first gate member to an exterior surface of the second gate member, thereby defining a clearance gap at the terminus of the elongate throat. The clearance gap is at least 0.5 mm less than a length of the flange. The first opening of the first gate member further comprises an annular flange oriented transverse to the flow direction and the clearance gap is about 0.6 mm to about 1.5 mm. The first gate member defines a third opening therethrough in a closed position portion thereof, the third opening being smaller than the first opening. The ratio of the area of the third opening to the second opening is in a range of about 1:1 to about 1:10. The first opening and the second opening are generally rectangular with a longitudinal axis thereof oriented generally perpendicular to the flow direction.

In another aspect, a method for assembly of the valve device is disclosed. This assembled device may be manufactured using spin welding to sealingly mate the conduit to a housing enclosing the actuator. The method includes providing an actuator enclosed within a housing with a stem protruding from the housing, an unassembled sprung gate, and a conduit. The housing includes a flange and the conduit includes a mating flange. The method includes fastening the first gate member and the second gate member to one another with an endless elastic band sandwiched therebetween and with the connecting member of each gate member of the sprung gate disposed about the stem to define an assembled sprung gate. Then, the assembled sprung gate is mated with the pocket of the conduit until the flange of the housing is seated against the mating flange of the conduit, or vice versa. The method then includes spin welding the flange of the housing and the mating flange of the conduit.

The endless elastic band permits the sprung gate assembly to produce an interference fit within the pocket without the large frictional forces that would be generated by compressing an integral gate constructed from a single, more rigid material, and reduces the need for narrow component tolerances. The slidable mechanical coupling permits the sprung gate assembly to be linearly moved between the connection opening and the pocket by a solenoid mechanism and mechanical coupling which is not precisely aligned with the gate assembly, further reducing potential frictional resistance to movement of the gate assembly.

BRIEF DESCRIPTION OF THE DRAWINGS

FIGS. 7-9 are a side perspective view, a bottom view, and a side perspective exploded view, respectively, of one embodiment of a sprung gate assembly.

FIGS. 10-11 are a side perspective view and a side perspective exploded view, respectively, of another embodiment of a sprung gate assembly.

DETAILED DESCRIPTION

Figure 1:
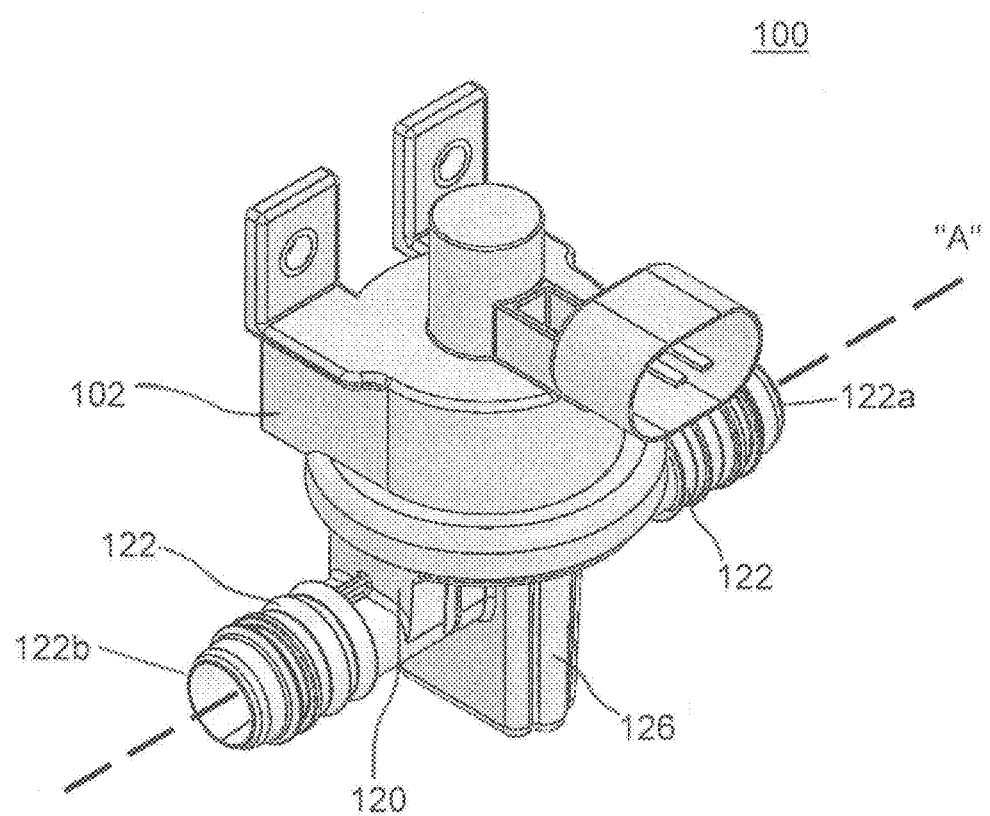
FIG. 1 is a perspective view of a valve including an actuator housing and valve mechanism.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

Figure 2:
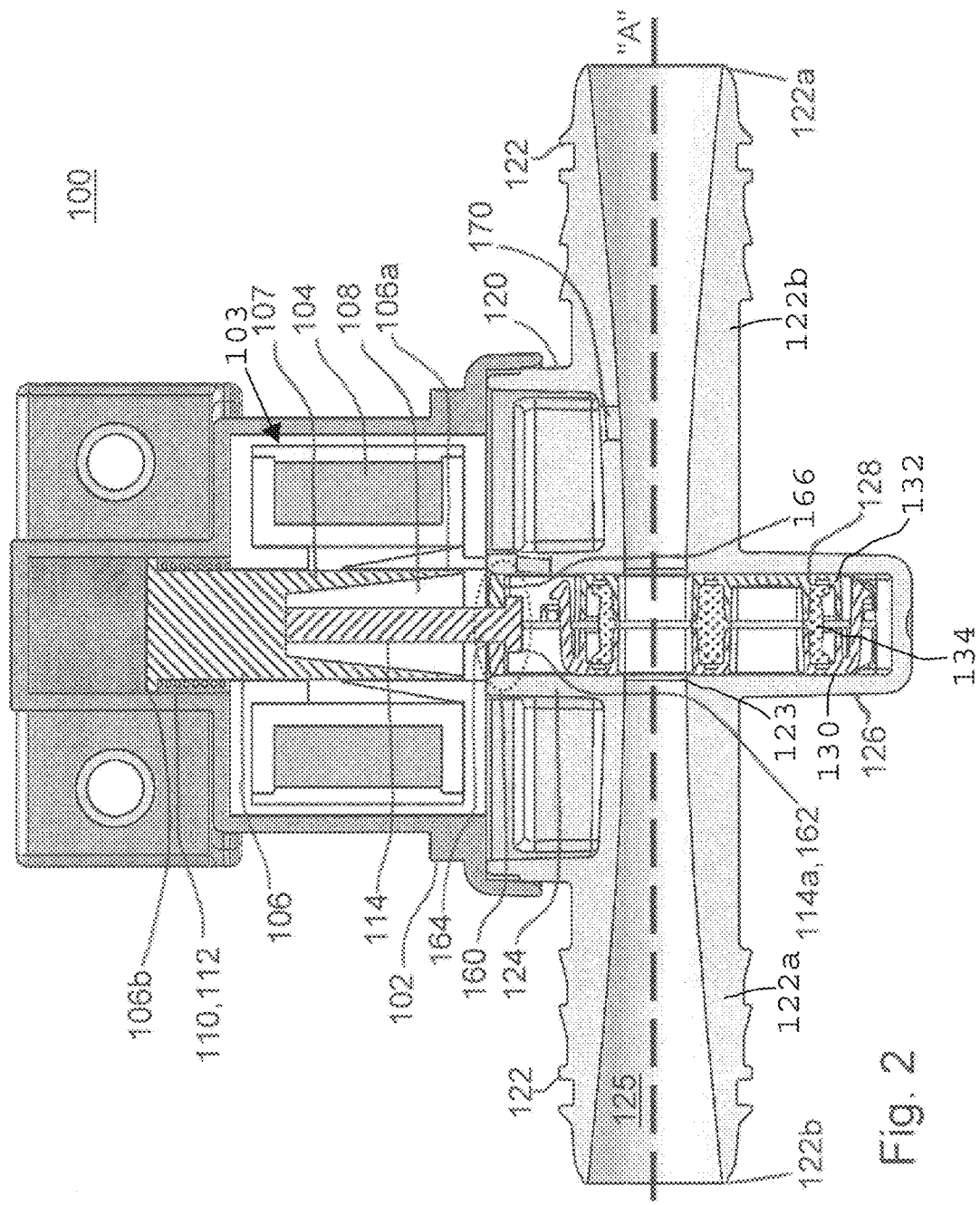
FIG. 2 is a cross-sectional view of the valve of FIG. 1 taken along the longitudinal axis and flow direction of the conduit of the valve mechanism, with a gate in an actively-powered, open position.
Figure 3:
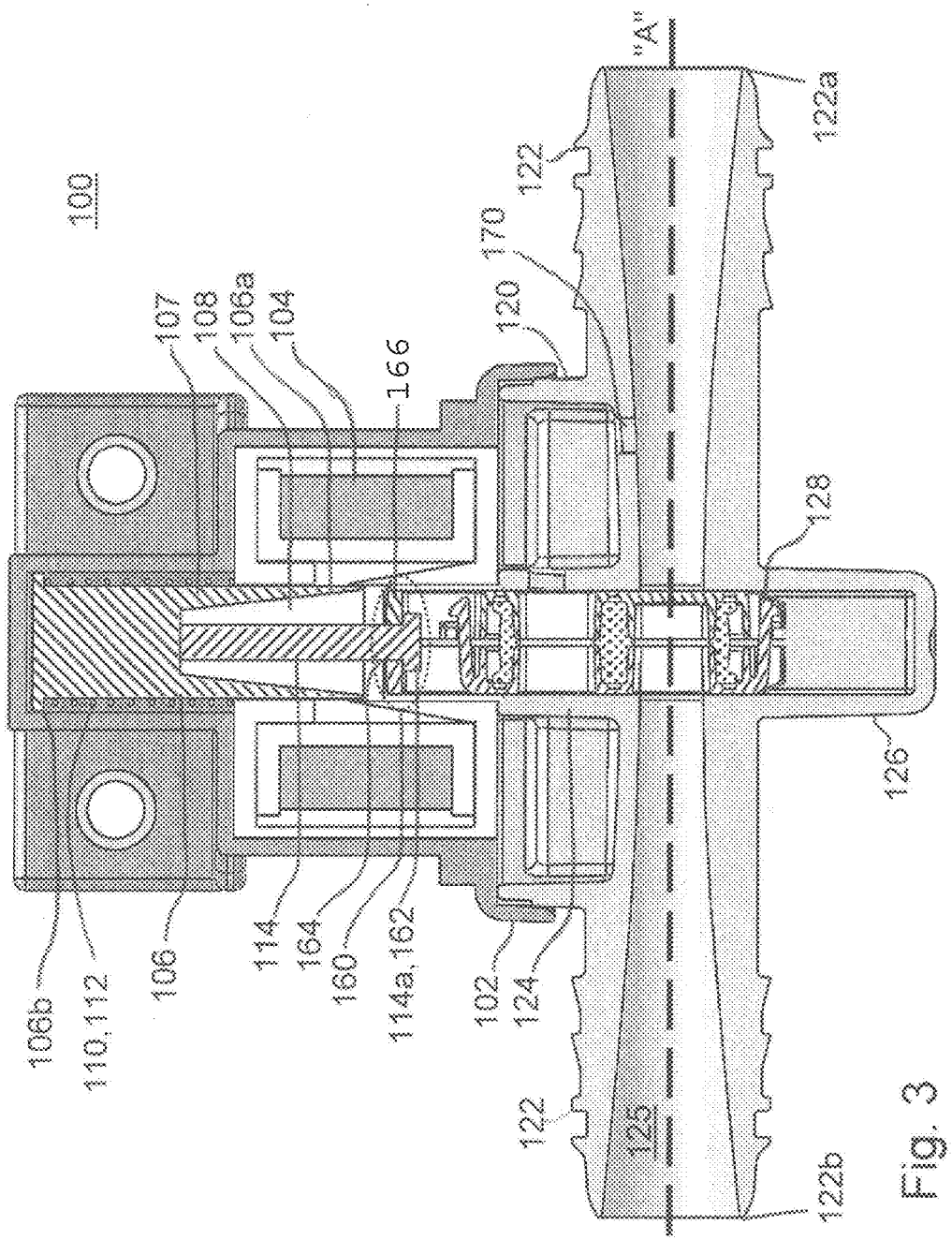
FIG. 3 is a cross-sectional view of the valve of FIGS. 1 and 2, taken along the longitudinal axis of the conduit of the valve mechanism, with the valve in an unpowered, closed position.
Figure 22:
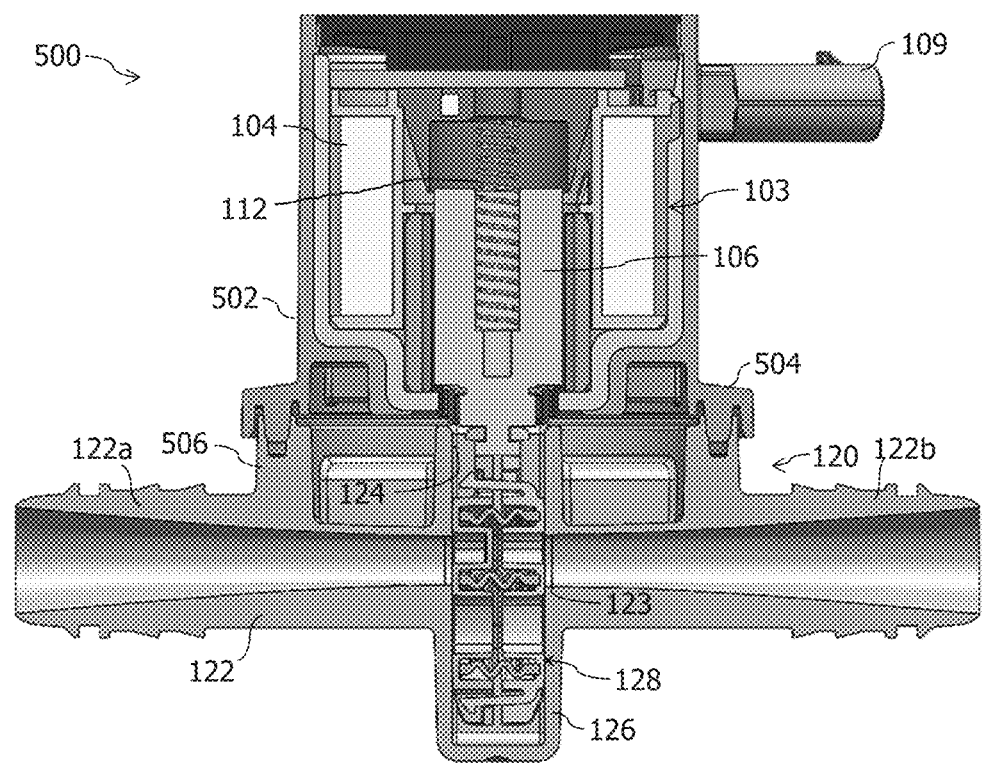
FIG. 22 is a cross-sectional view of an embodiment of a gate valve taken along the longitudinal axis of the conduit with a gate in a closed position.

FIGS. 1-3 illustrate one embodiment of a gate valve 100 adapted to selectively control the flow of a fluid, for example, air flowing from an intake to a brake vacuum boost system. The gate valve 100 may have a housing 102 containing an actuator 103 having a solenoid coil 104 and an armature 106 connectable to a valve mechanism 120. The armature 106 includes an insertion end 106a received within the solenoid coil 104 and an adjoining body portion 107 that is more fully received within the solenoid coil upon the application of an electrical current to the coil. In one construction, the insertion end 106a and body portion 107 may be cylinders manufactured from a magnetic or paramagnetic material, for example an iron-containing alloy or a ferrite-containing composite material. In another construction, the insertion end 106a and body portion 107 may be cylinders having an internal recess 108 tapering from the insertion end 106a in the direction of the body portion 107 in order to provide for a gradual increase in pull-in force. The taper may be configured so that the pull-in force is greater than an oppositely-directed biasing force produced by a biasing element 110. As shown in FIG. 2, the biasing element 110 may be a coil spring 112 surrounding the body portion 107 of the armature 106 and abutting both the solenoid coil 104 and a non-insertion end 106b, but it will be appreciated that the biasing element could be a diaphragm or flat spring abutting or coupled to the non-insertion end, a leaf spring abutting or coupled to the non-insertion end, etc. As illustrated in FIG. 22, another embodiment of a gate valve is shown that includes the biasing element 110 received in a bore 111 within the body portion 107 of the armature 106. Those of skill in the art will also appreciate that the solenoid may instead be a bistable solenoid including other biasing elements.

The valve mechanism 120 includes a conduit 122 defining a connection opening 124 facing the armature 106 and opening into a pocket 126 for receiving a sprung gate assembly 128, and the sprung gate assembly 128 linearly movable within the pocket 126 and within the connection opening 124. As seen in FIG. 2, the pocket 126 separates the conduit 122 into a first section 122a and a second section 122b and the ends of conduit adjacent to the pocket 126 define valve opening 123. The conduit 122 may be a tube that continuously, gradually tapers or narrows along a longitudinal axis "A" from both ends toward the valve opening 123, thereby having its smallest inner diameter at the valve opening 123. This hour glass-shaped cross-section 125 of the conduit path reduces the frictional forces acting on the surfaces of the sprung gate assembly 128 during its linear movement to or from an open or a closed position. This gradual narrowing of the conduit 122 also minimizes the pressure drop across the valve. In the illustrated constructions, the cross-section perpendicular to the longitudinal axis "A" is circular, but in variations the cross-section 127 may be elliptical (with uniform or tapering transverse and conjugate diameters), polygonal (with uniform or tapering characteristic widths), etc.

Figure 4:
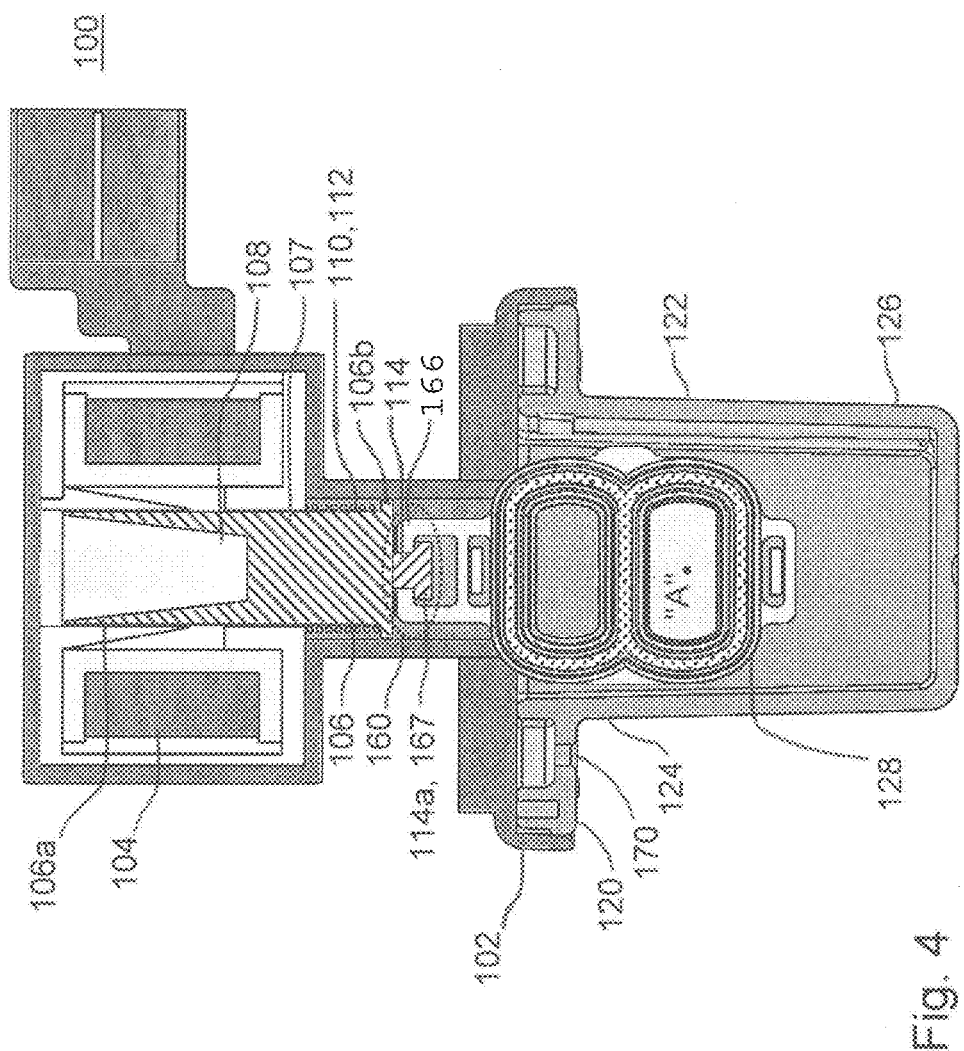
FIG. 4 is a cross-sectional view of a similar embodiment of a valve, taken along a plane perpendicular to the longitudinal axis and flow direction of the conduit of the valve mechanism, with a gate in an actively-powered, closed position.
Figure 5:
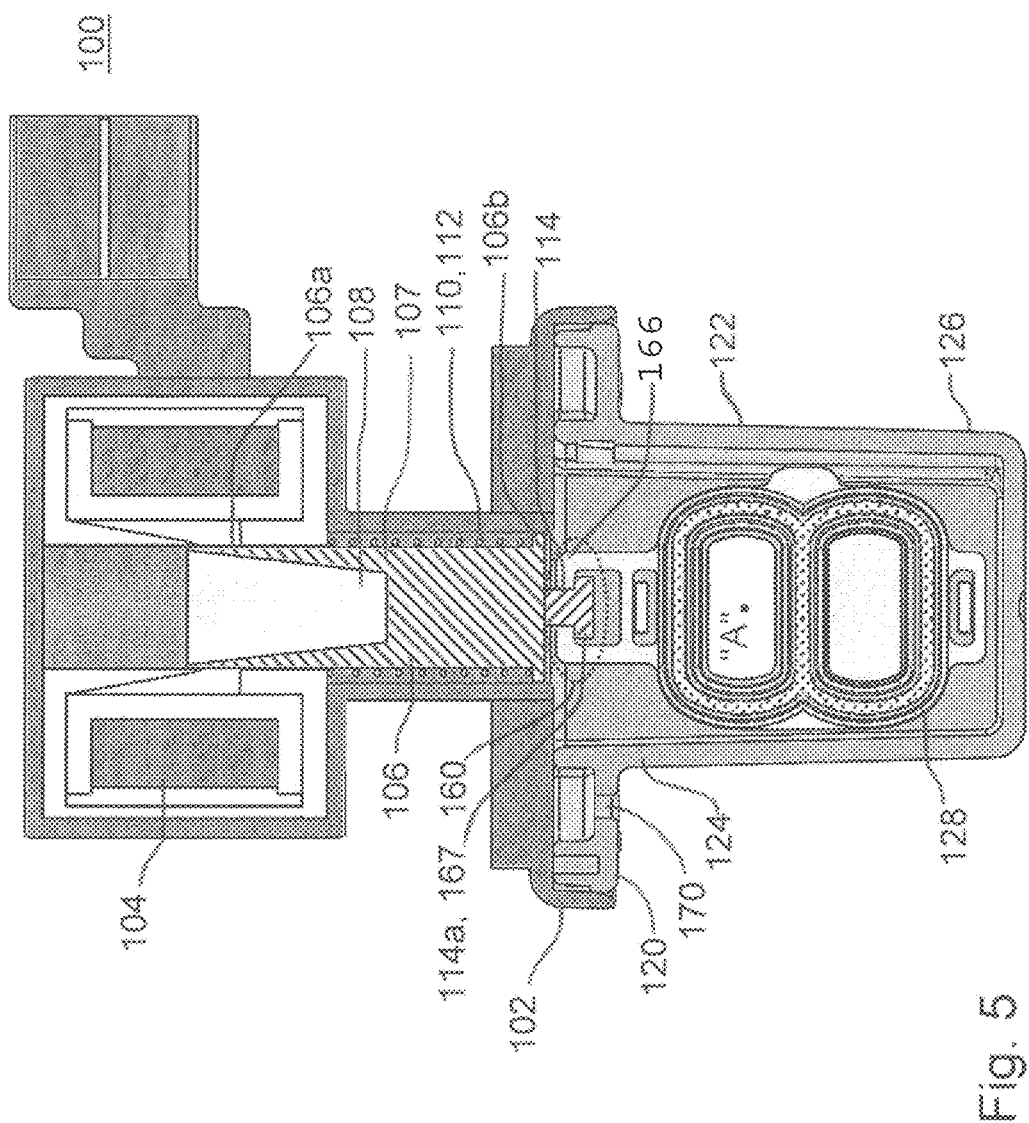
FIG. 5 is a cross-sectional view of the valve of FIG. 4, taken along a plane perpendicular to the longitudinal axis of the conduit of the valve mechanism, with the gate in an unpowered, open position.

In the embodiment of FIGS. 1-3, the sprung gate assembly 128 is mechanically coupled to the armature 106 by a stem 114 projecting from within the internal recess 108. In the embodiment of FIG. 22, the stem 114 projects from the inserted end 106a of the armature 106. In another embodiment, the stem 114 may project from the non-inserted end of the armature 106, depending whether the solenoid coil 104 and armature 106 are configured to pull the stem toward or away from the valve mechanism 120 and the connection opening 124. As shown in the embodiment of FIGS. 4-5, the relative arrangement of the solenoid coil 104, armature 106, biasing element 110, and stem 114 may be altered to change the gate valve 100 from a normally closed valve to a normally open valve or vice versa (depending upon the detailed construction of the sprung gate assembly 128, as discussed further below). In some constructions, the stem 114 may be an integral projection from the armature 106, but in other constructions the stem may be an affixed projection manufactured from another, preferably non-magnetic, material.

A proximal end 114a of the stem 114 may be affixed to the sprung gate assembly 128, but the mechanical coupling preferably allows the sprung gate assembly 128 to move slideably in at least a direction parallel to the longitudinal axis of the conduit, especially in response to a bias force applied by an endless elastic band 134 positioned between the members 130, 132 of the sprung gate assembly 128. In some constructions, the mechanical coupling includes a rail system 160 that permits sliding movement of the members 130, 132 of the sprung gate assembly 128 relative to the stem 114 in a direction parallel to the longitudinal axis A. This slidable mechanical coupling allows the actuator 103 to linearly move the sprung gate assembly 128 within the pocket 126, without pulling the gate assembly towards either end of the conduit 122. Less than perfect alignment of the solenoid coil 104, armature 106, and/or stem 114 with the valve mechanism 120 would otherwise seek to cant the sprung gate assembly 128 from its path and thus tend to increase the frictional forces between the gate assembly and the walls of the conduit 122.

In the embodiments shown in FIGS. 2-3, 7-9, and 10-11, the rail system 160 may include a guide rail 162 positioned near the proximal end 114a of the stem 114, with raceway grooves 164 disposed on opposing sides thereof. The sprung gate assembly 128 correspondingly includes a slider 166 configured to wrap around the guide rail 162 and project within the raceway grooves 164. In a variant construction, the rail system 160 may be reversed, with a slider 166 positioned near the proximal end 114a of the stem 114 and the members 130, 132 of the sprung gate assembly 128 each including a guide rail 162 and racetrack groove 164.

Figure 20:
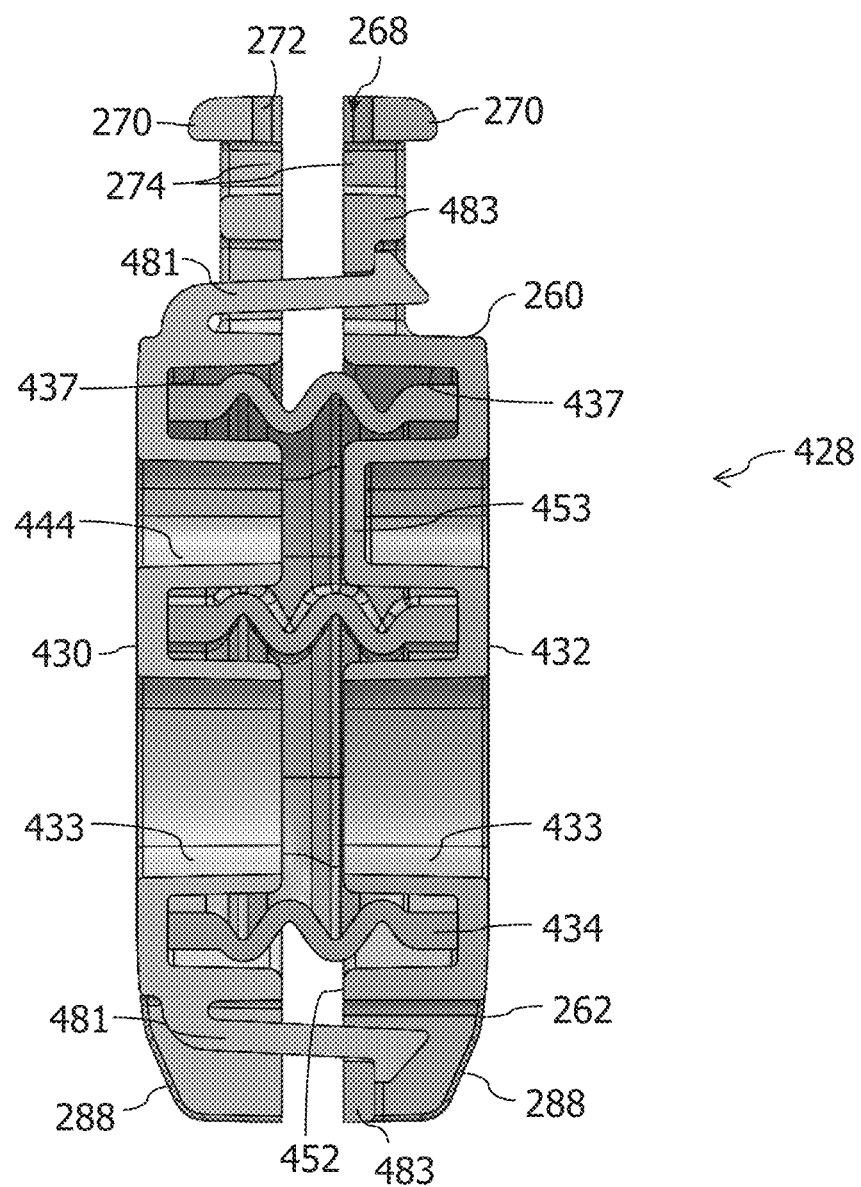
FIG. 20 is a side cross-sectional, assembled view of an embodiment of a sprung gate assembly.
Figure 21:
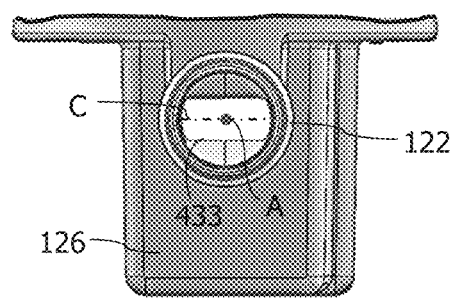
FIG. 21 is an end view looking into the motive end of the conduit with a sprung gate in an open position.

In the embodiment shown in FIGS. 4-5, the proximal end 114a of the stem 114 may include an enlarged, plate-like head 167. As better shown in FIGS. 12-14, the members 230', 232' of the sprung gate assembly 128 may collectively define a multi-part socket 268 which snaps around the head 167 to permit sliding movement in multiple directions perpendicular to the path of linear movement of the sprung gate assembly. Similarly, the gate members 430, 432 of FIG. 20 also collectively define a multi-part socket 468. As shown in FIGS. 20 and 21, the plate-like head 167 may be an annular flange at the proximal end 114a of the stem 114, and as such, the spring gate assembly 128, in particular the sprung gate 228" of FIGS. 12-14 or the sprung gate 428 of FIG. 20, are free to rotate 360 degrees or more relative to the stem 114 during assembly.

Referring to FIGS. 2 and 3, the valve mechanism 120 may include a vent port 170 fluidly communicating with the connection opening 124 and, as further described below, the sprung gate assembly 128 and pocket 126, to vent fluids which leak past the sprung gate assembly and into the pocket. In highly dynamic flow environments, for example, an automotive engine in which turbocharging is used to boost air pressure within an intake manifold, differential pressures across the gate valve 100 may vary widely and even transiently reverse. High pressure air leaking into the pocket 126 may pressurize the pocket and alter the balance of solenoid operating force, biasing force, and expected frictional forces within the gate valve 100. A large differential in the pressurization of the solenoid mechanism and the pocket 126 may prevent the spring gate mechanism from linearly moving completely within the pocket, causing the valve to operate in a partially-open-and-closed state. Vent port 170 may open to the interior of the conduit 122 in order to allow fluid to flow from the pocket 126 to an inlet end of the conduit 122a (as shown in FIGS. 2-3) if the fluid is to be contained within the system, or may open to the exterior of the valve mechanism 120 (as shown in FIGS. 4-5) if the fluid may be released to the environment.

Figure 6:
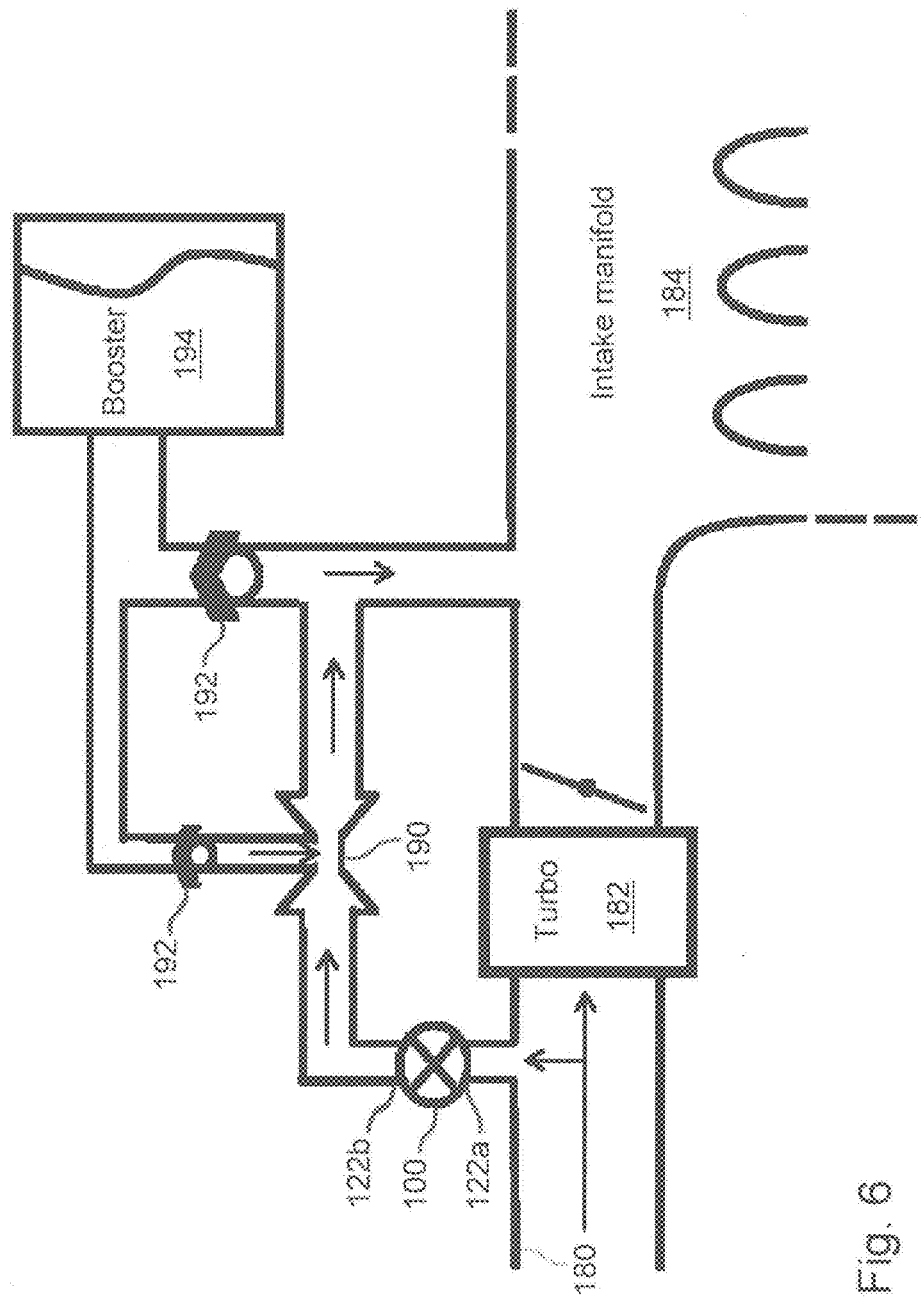
FIG. 6 is a schematic view of a non-specific embodiment in relation to an aspirator-based vacuum generator and power brake booster assembly.

Referring now to FIG. 6, the gate valve 100 may be used to control the flow of air through a vacuum boost power brake system. The conduit 122 may be connected to an air intake 180 at an inlet end 122a and to a vacuum generator, in the illustrated example an aspirator 190, at an outlet end 122b. In an exemplary turbocharged engine configuration, a turbocharger and air intercooler 182 may pressurize the air being supplied to an intake manifold 184, causing the pressure within the intake manifold to exceed the air pressure at the inlet end 122a, and potentially causing a transient reverse flow through the aspirator 190. Check valves 192 prevent the power brake booster 194 from losing its vacuum charge; however, reverse flow through the aspirator 190 can cause the fluid pressure at the outlet end 122b to exceed that at the inlet end 122a. This reversed pressure differential may be even greater than the ordinary pressure differential across the gate valve 100, since turbochargers customarily provide boost pressures of about 1 atmosphere (relative) and, as such, high boost pressure at the inlet end 122a is likely to be substantially less than 1 atmosphere (absolute). Consequently, different embodiments of a sprung gate assembly 128, further described below, may be better suited for some applications. In addition, those of skill will appreciate that the gate valve 100 may be used in other applications, including non-automotive applications, and with fluids other than air.

Referring to FIGS. 7-9, a first embodiment of a sprung gate assembly, generally designated as reference number 228, is illustrated. The sprung gate assembly 228 includes a first gate member 230, a second gate member 232, and an endless elastic band 234 received between the first and second gate members 230, 232. The endless elastic band 234 may be described as being sandwiched between the first and second gate members 230, 232. As seen in FIG. 9, the second gate member 232 includes a track 236, for receiving a portion of the endless elastic band, as a portion of its interior surface 252. While not visible in FIGS. 7-9, the first gate member 230 also includes a track 236. In one embodiment, the elastic material is a natural or synthetic rubber.

The first and second gate members 230, 232 may be the same or substantially similar members, but are not intrinsically limited in that manner. As illustrated in FIGS. 7 and 9, the first and second gate members 230, 232 are the same, and thus can be positioned facing either the inlet end 122*a* or the outlet end 122*b* of the conduit 122. This produces a valve with similar performance regardless of the direction of fluid flow in the conduit 122.

Referring to FIGS. 7 and 9 specifically, the first and second gate members 230, 232 both have openings 233 therein which collectively define a passage 229. In an open position, such as illustrated in FIG. 5, the passage 229 through the sprung gate assembly 228 is aligned with the conduit 122 to allow fluid to flow therethrough. The portion of the gate having passage 229 is referred to herein as the open position portion 240 (FIG. 7), and the adjacent portion, illustrated opposite the slider 266, is referred to as the closed position portion 242 because this portion of the gate 228, when moved to a closed position, obstructs the conduit 122 to prevent fluid flow therethrough. The closed position portion 242 of each gate member 230, 232, in this embodiment, has a substantially smooth continuous exterior surface 250. Those of skill will appreciate that the open position and closed position portions 240, 242 may be reversed, with the open position portion 240 opposite the slider 266, providing a second means of changing a gate valve design from normally closed to normally open (or vice versa).

In this first embodiment, the endless elastic band 234 is generally oval shaped and thereby includes an inner perimeter 282 defining an open space, an outer perimeter 284, and opposing first and second sides 286, 288. The endless elastic band 234 is received in the tracks 236 of the first and second gate members 230, 232 with the first side 286 received in one track 236 and the second side 288 received in the other track 236. When the endless band 234 is seated in the tracks 236 of the first and second gate members 230, 232, the first and the second gate members 230, 232 are spaced apart from one another by a distance D (FIG. 7). The tracks 236 are positioned to recess or inset the endless elastic band 234 a distance from the outer perimeter of the gate members as well. As seen in FIG. 8, this construction defines a channel 254 around the outer surface of the endless elastic band 234 between the first and second gate members 230, 232 for fluid flow around the sprung gate 228 within the pocket 126. When the vent port 170 is present, the channel 254 is in fluid communication therewith. This venting via channel 254 is generally perpendicular to the direction of fluid flow through the conduit 122 and vents fluid from the pocket 126 as the armature 106 moves the gate more fully into the pocket.

The endless elastic band 234 is compressible between the first and the second gate members 230, 232 and therefore functions as a spring acting parallel to the direction of flow through the conduit 122. Additionally, the endless elastic band 234 is expandable radially outward in response to forces applied to the endless elastic band 234 by fluid flowing through the conduit 122 to form a seal between the endless elastic band 234 and the outer wall portion of the tracks 236 in the first and second gate members 230, 232. The endless elastic band 234 biases the first and second gate members into a sealing engagement with opposing walls of the pocket 126.

In operation, in the open position as illustrated in FIGS. 2 and 5 with reference to the sprung gate assembly of FIGS. 7-9, the fluid flowing through the conduit, whether flowing left to right or right to left, passes through passage 229 in the sprung gate assembly 228 and the pressure of the fluid provides a force acting on the endless elastic band 234 directed radially outward, thereby pressing the endless elastic band into sealing engagement with the outer perimeter of the tracks 236. This sealing engagement reduces or prevents fluid leakage into the actuator 103, which renders the sprung gate assembly 228 more leak resistant than a single-material, uniformly rigid gate. This embodiment is well suited for use with naturally aspirated engines, in particular with air flowing at atmospheric or sub-atmospheric pressures through the conduit 122. However, in an embodiment where the conduit 122 is connected to the boost pressure side of a supercharged air intake system, the leak protection provided by the endless elastic band 234 aids in preventing the fluid flowing through the conduit 122 from generating pressures within the pocket 126 which could act to push the sprung gate assembly 228 (and armature 106, etc.) to another position or otherwise impede controlled movement of the assembly. The pressures in a supercharged engine, and experienced by the sprung gate assembly 228 and gate valve 100 generally, range between about 5 psi and about 30 psi.

The endless elastic band 234 also produces a gate that is less sensitive to manufacturing tolerances, in particular with respect to the dimensions of pocket 126 and the thickness of the gate members 230, 232, because of the presence of the endless elastic band. The pocket 126 is typically formed to have a width that is smaller than the unloaded width of the sprung gate 228 so as to produce an interference fit. In the sprung gate assembly 228, the endless elastic band 234 becomes compressed between the first and second gate members 230, 232 as the sprung gate 228 is inserted into the pocket 126. The endless elastic band's spring force or biasing action on the first and second gate members 230, 232 when inserted (wedged) into the pocket 126 presses each respective gate member into a sealing engagement with a wall of the pocket to reduce or prevent leaks. Most importantly, the substantially lower modulus of elasticity of the endless elastic band versus that of the rigid gate members 230, 232, or that of a single rigid gate, means that the normal forces acting upon the sprung gate assembly 228 and resisting linear movement of the assembly along its path are substantially less. This reduces the frictional forces (frictional force is equal to normal force times the coefficient of friction) and thus the required solenoid operating force. This benefit is equally applicable to the other embodiments described below.

Referring now to FIGS. 10 and 11, a second embodiment of a sprung gate assembly, generally designated as reference number 228', is provided, which similarly includes a first gate member 230', a second gate member 232', and an endless elastic band 235 received between the first and second gate members 230', 232'. The endless elastic band 235 may be described as being sandwiched between the first and second gate members 230', 232'. As seen in FIG. 11, the second gate member 232' includes a track 237 as a portion of or recessed into its interior surface 252' for receiving a portion of the endless elastic band 235. While not visible in FIGS. 10 and 11, the first gate member 230' also includes a track 237. Both gate members 230', 232' also include a slider 266' for slideably coupling the gate assembly 228' to the armature 106 as described above. However, as discussed above, in all such embodiments the members 230, 230', 232, 232', etc. may alternately include a guide rail and racetrack grooves similar to the guide rail 162 and racetrack grooves 164 of the stem 114 or collectively define a multi-part socket 468 for receiving an annular plate head 167.

Here, as illustrated in FIG. 11, the endless elastic band 235 is generally a figure-eight shaped band of elastic material and thereby includes a first inner perimeter 272 defining a first open space, a second inner perimeter 273 defining a second open space, an outer perimeter 274, and opposing first and second sides 276, 278. The endless elastic band 235 is received in the tracks 237 of the first and second gate members 230', 232' with the first side 276 received in one track 237 and the second side 278 received in the other track 237. Since the endless elastic band 235 is figure-eight shaped, the track 237 is also typically figure-eight shaped. When the endless elastic band 235 is seated in the tracks 237' of the first and second gate members 230', 232', the first and the second gate members 230', 232' are spaced apart from one another by a distance D' (FIG. 10). The tracks 237 are positioned to recess the endless elastic band 235 a distance from the outer perimeter of the first and second gate members 230', 232'.

In the embodiment shown in FIGS. 10 and 11, the first and second gate members 230', 232' are structurally different from one another, but both have first openings 233' therein which collectively defines a passage 229' which, in an open position, is aligned with the conduit 122 to allow fluid to flow therethrough. This portion of the gate is referred to as the open position portion 240' (FIG. 10), and an adjacent portion thereto, opposite the slider 266', is referred to as the closed position portion 242' because this portion of the spring gate assembly 228', when moved to a closed position, obstructs the conduit 122 to prevent fluid flow therethrough. In this embodiment, the closed position portion 242' of the first gate member 230' includes a second opening 244 therethrough. The second opening may be dimensioned substantially the same as the first opening 233'. The second gate member 232' does not include a second opening in the closed position portion 242' thereof. Instead, the closed portion 242' of the second gate member 232' has a substantially continuous smooth exterior surface. The second gate member 232' may optionally include a plug 253 projecting from its interior surface 252'. This plug 253 fits within the dimensions of the second open space defined by the endless elastic band 235, and is dimensioned to be at least the size of the second opening 244 in the first gate member 230', which defines a smaller opening than the second inner perimeter 273 of the endless elastic band 235. The plug 253 may be a substantially smooth portion of the interior surface 252' of the second gate member 232'.

In the open position, fluid flowing through passage 229' provides a force acting on the endless elastic band 235 directed radially outward, thereby pressing the endless elastic band into sealing engagement with the outer perimeter of the tracks 237. This sealing engagement reduces or prevents fluid leakage into the actuator 103 and pocket 126, which renders the gate 228' in the embodiment of FIGS. 10 and 11 more leak resistant than a single-material, uniformly rigid gate.

In the closed position, fluid flow in the conduit 122 may be in the direction toward the side of the sprung gate 228' defined by the first gate member 230', i.e., the first gate member 230' may face an inlet end 122a of the gate valve 100. In particular, this orientation of flow is beneficial when the conduit 122 is connected to the boost pressure side of a supercharged air intake system and generally is operated to stop boost pressure from flowing therethrough. This is so because the boost pressure passes through the second opening 244 and is directed by the plug 253 toward the second inner perimeter 273 of the endless elastic band 235 to act radially outwardly on the endless elastic band to sealingly engage it against the tracks 237 of the first and second gate members 230', 232'. The presence of the second opening 244 also minimizes the surface area of the exterior surface of the first gate member 230' upon which the boost pressure can apply a force acting parallel to the flow direction within the conduit 122 to axially compress the endless elastic band 235. If the boost pressure does compress the endless elastic band 235 in the axial direction, one of the gate members 230', 232' would move closer to the other, decreasing D', and creating a gap between one wall of the pocket 126 and that gate member through which fluid could leak. This is an undesirable result. Accordingly, for gate member 228', it would be undesirable for the boost pressure to flow into the conduit in a direction that would impact the second gate member's 232' substantially continuous smooth exterior surface. In the example illustrated in FIG. 6, the opposite orientation of flow is beneficial since the highest pressure differential is likely to be a reversed pressure differential caused by boost pressure within the intake manifold crossing the aspirator to an outlet side of the gate valve.

Figure 12:
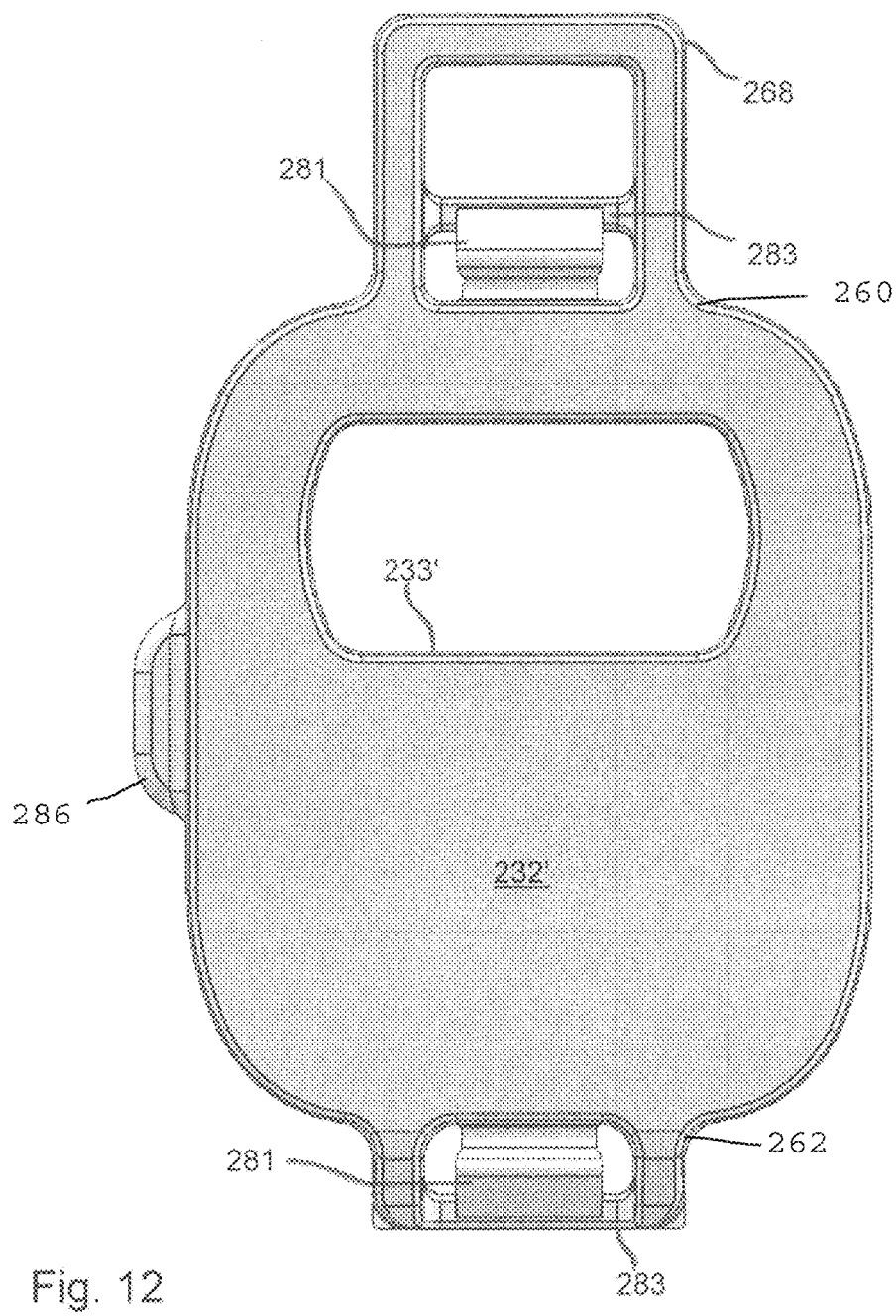
FIGS. 12-14 are a front view of a variant sprung gate member, a side cross-section of a variant sprung gate assembly, and a top perspective view of the variant sprung gate assembly. A pair of latches 281 are shown in FIG. 12 for context.
Figure 13:
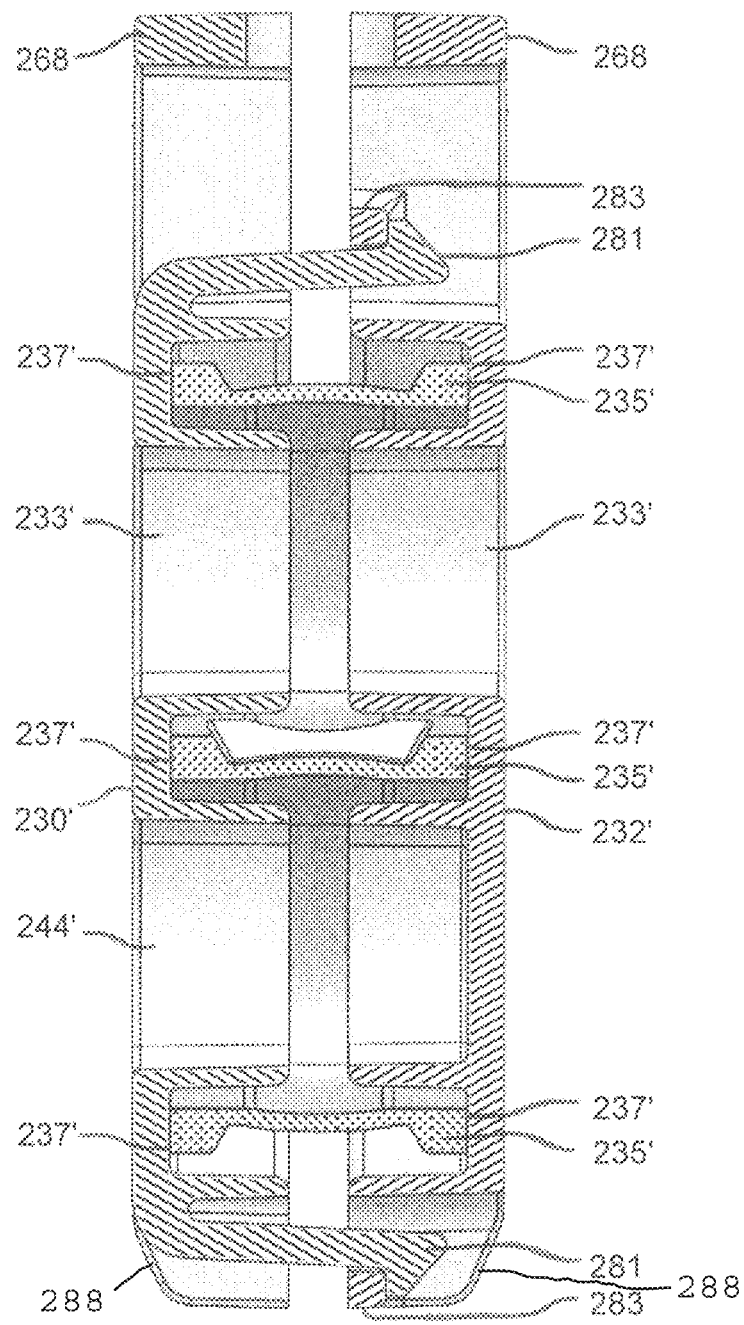
Figure 14:
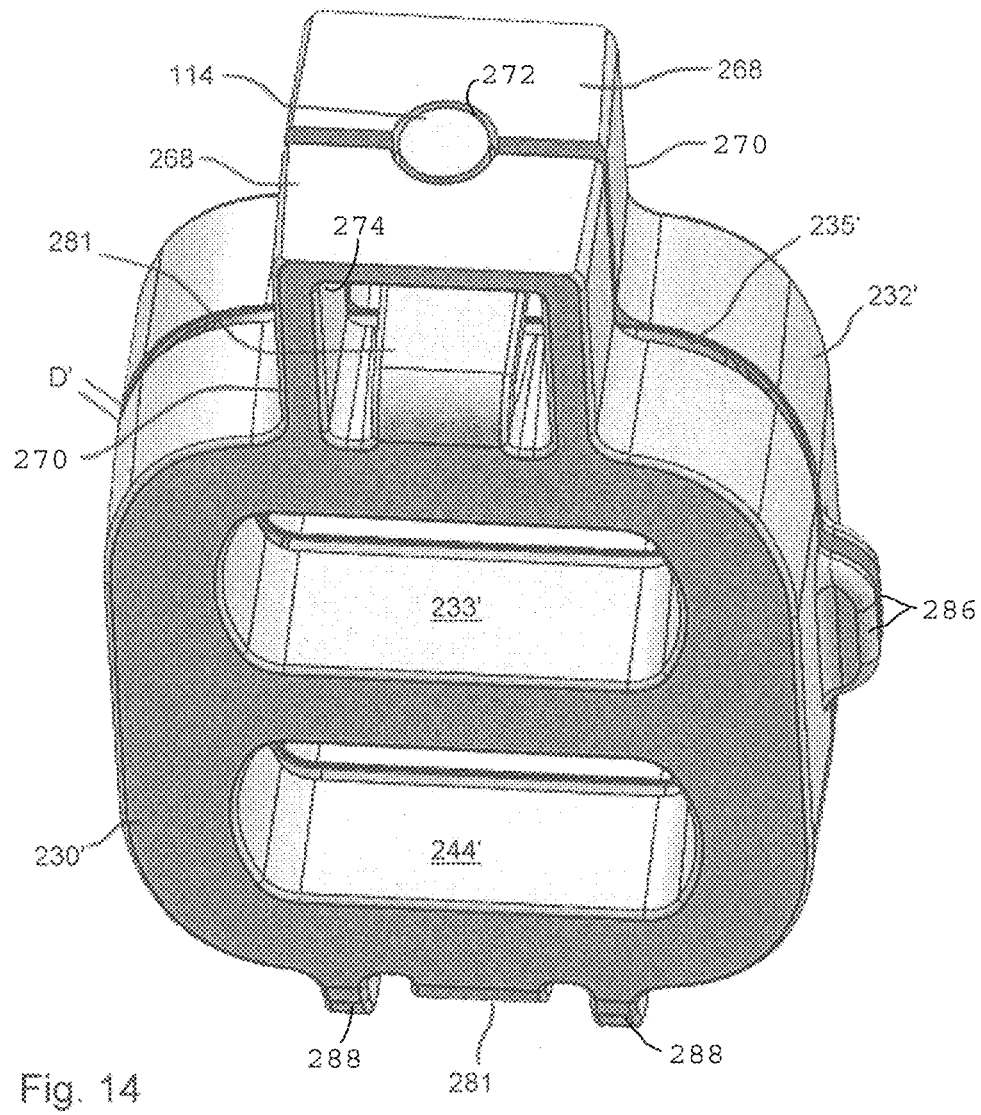

Referring now to FIGS. 12-14 and also FIG. 20, in a variant of this or other embodiments, one of the gate members 230', 232' of FIGS. 12-14 and the gate members 430, 432 of FIG. 20 may include a latch 281, 481 (respectively) and the other of the gate members 230', 232' may include a correspondingly disposed detent 283, 483 (respectively). As illustrated, the one may include a plurality of latches 281, 481 and the other may include a plurality of detents, or each may include one latch 281, 481 and one detent 283, 483, with the latch 281, 481 and detent 283, 483 disposed on opposite ends of the gate member 230', 232' or 430, 432 to correspond to the disposition of its counterpart element. The latches 281, 481 and detents assist in the assembly of the sprung gate assembly 228' (or 128, 228, 428 etc.) by actively retaining the assembly in an assembled configuration prior to insertion within the pocket 126.

Figure 15:
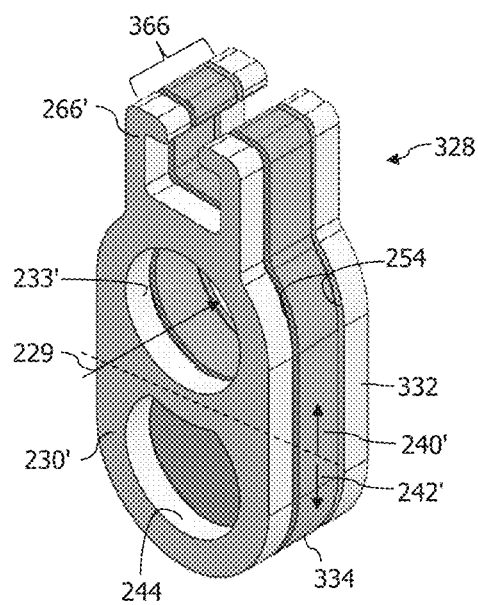
FIGS. 15-17 are a side perspective view, a front view, and a longitudinal cross-section of yet another embodiment of a sprung gate assembly.
Figure 16:
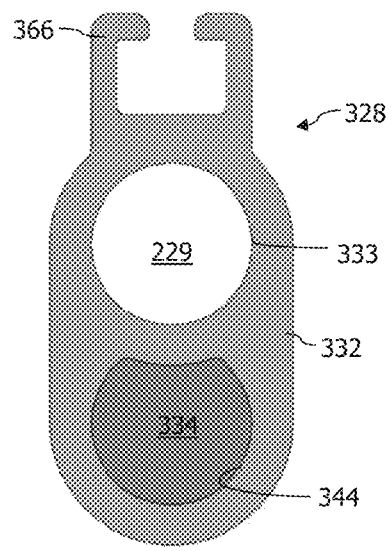
Figure 17:
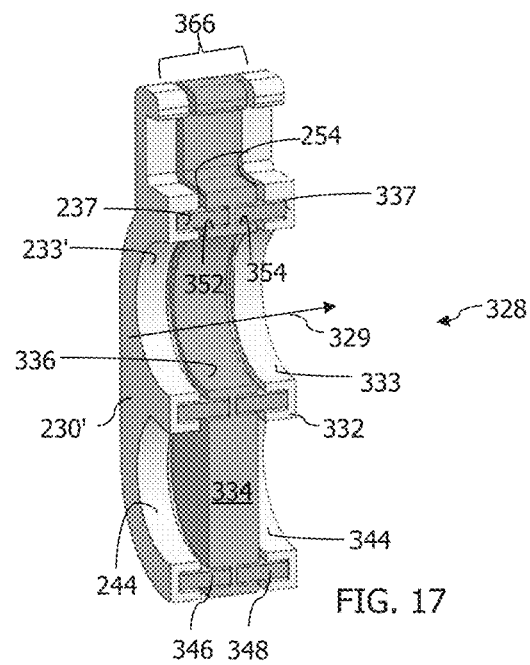

Referring now to FIGS. 15-17, a universal sprung gate assembly (operable with flow directed toward either of the first or the second gate members) is illustrated and designated by reference numeral 328. The universal sprung gate 328 has the same first gate member 230' as the embodiment in FIGS. 10 and 11, a second gate member 332 that has the same general construction as the first gate member 230', an inner gate member 334 that provides the obstruction necessary for the closed position, a first endless elastic band 346 disposed within a track defined between the first gate member 230' and the inner gate member 334, and a second endless elastic band 348 disposed within a track defined between the second gate member 332 and the inner gate member 334. The second gate member 332, see FIG. 16, may include a slider 366, a first opening 333 in the open position portion 240', and a second opening 344 in the closed position portion 242' thereof. The inner gate member 334 includes an opening 336 in an open position portion 240' thereof and has opposing substantially continuous exterior surfaces defining the closed position portion 242', which can obstruct the flow of fluid through the conduit when the universal sprung gate 328 is in the closed position.

In the embodiment of FIGS. 15-17, the figure-eight shaped endless elastic band is preferred because of the two openings in each of the first and second gate members 230', 332. The figure-eight shaped endless elastic bands 346, 348 are as described above. Here, the first endless elastic band 346 is seated both in a first track 352 in the inner gate member 334 and in a track 237 in the first gate member 230', which are preferably in the shape of a figure-eight dimensioned to receive the first endless elastic band 346. Similarly, the second endless elastic band 348 is seated both in a second track 354 in the inner gate member 334 and in a track 337 in the second gate member 332, which are preferably in the shape of a figure-eight dimensioned to receive the second endless elastic band 348.

In operation, the universal sprung gate 328, in the open position and in the closed position, operates as described above with respect to the first gate member side of the sprung gate 228' of FIGS. 10 and 11. The universal sprung gate 328 may be used in normally aspirated, supercharged, or turbocharged engines without requiring any particular flow orientation. Its universal nature and the benefit of the reduced surface area in the closed position portion of each of the first and second gate members make this gate function to seal the gate to reduce or prevent leakage into the actuator 103 and pocket 126 regardless of the direction of flow through the conduit. This embodiment also has the benefit of providing multiple channels 254 around the exterior of the endless elastic band to provide fluid communication between the actuator and the vent port 170, if present.

Also, in a variant of this or other embodiments, as shown in FIGS. 12-14 and in the embodiment of FIG. 20, the gate members 230', 232' of FIGS. 12-14 and 430, 432 of FIG. 20 each include a connecting member 270 protruding from the trailing end 260 thereof toward the stem 114 of the actuator 103. The trailing end 260 is relative to a leading end 262 during insertion of the gate assembly into the pocket 126. The connecting members 270 collectively define a multi-part socket 268 having a generally annular opening 272 for receiving a portion of the stem 114 and a larger chamber 274 for receiving the plate-like head 167, which may also be annularly shaped. The multi-part socket 268 snaps around the head 167 of the stem 114 of the mechanical coupling as shown in FIG. 22. The multi-part socket 268 assists in the assembly of the sprung gate assembly 228' (or 128, 228, etc.) by actively retaining the assembly upon the stem 114 prior to insertion within the pocket 126. The larger chamber 274 is typically larger than the plate-like head 167 of the stem 114, thereby providing clearance for the sprung gate assembly to rotate about the stem 114. As mentioned above, this is advantageous because the spring gate assembly 228', 428 will be free to rotate 360 degrees or more relative to the stem 114 during assembly.

With reference to FIGS. 12 and 14, one or more of the gate members 230', 232' may include an orientation member 286, which is applicable to all embodiments of the sprung gate assembly disclosed herein. In one embodiment, the orientation member 286 may be a tab protruding outward from the side of one or more of the gate members 230', 232'. Accordingly, the pocket 126 will have a receiving orientation member (not shown) shaped and sized to receive the orientation member 286. The orientation member 286 and receiving orientation member may be any type of key and keyway configuration, and either the pocket or the gate assembly may have either portion thereof.

Additionally, any of the sprung gate assemblies, for ease of insertion into the pocket 126, may include tapered legs 288 as shown in FIGS. 13, 14, and 20 extending away from the leading end 262 of either or both of the gate members 230', 232', 430, 432, wherein the taper of legs 288 is in the exterior surface of the gate member and the taper is inward in a direction generally toward a plane coincident with the interior surface of the same gate member.

Figure 18:
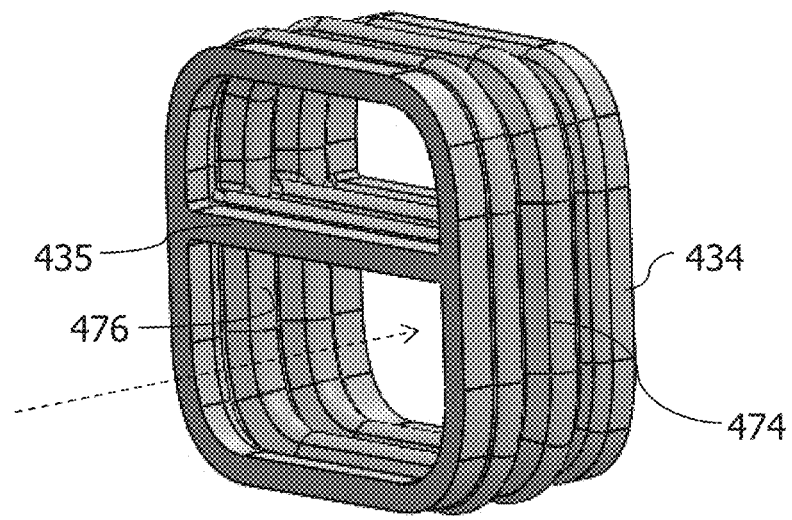
FIG. 18 is an embodiment for a bellowed, endless elastic band.
Figure 19:
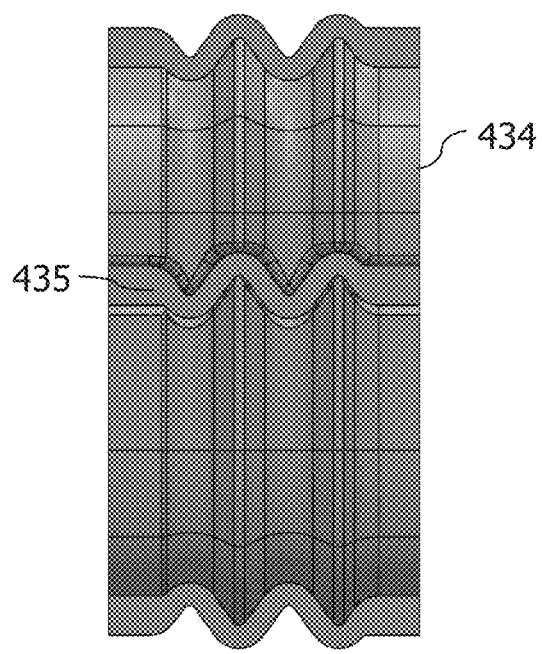
FIG. 19 is a longitudinal cross-sectional view of the bellowed, endless elastic band of FIG. 18.

Referring now to FIG. 20, a fifth embodiment of a sprung gate assembly, generally designated as reference number 428, is provided, which similarly includes a first gate member 430, a second gate member 432, and an endless elastic band 434, as described with respect to FIGS. 18 and 19 herein, received between the first and second gate members 430, 432. The endless elastic band 434 may be described as being sandwiched between the first and second gate members 430, 432. In this embodiment, the general construction of the first and second gate members 430, 432 corresponds to the construction described with respect to FIGS. 10 and 11. The second gate member 432 includes a track 437 as a portion of or recessed into its interior surface 452 and so does the first gate member 430 such that the tracks 437 each receive a portion of the endless elastic band 434 once assembled together, and the first and second gate members 430, 432 are structurally different from one another, but both have first openings 433 therein collectively defining a passage 429. In this embodiment, the closed position is defined by a second opening 444 in the first gate member aligned with a plug 453 projecting from the interior surface 452 of the second gate member 432. This plug 453 fits within the dimensions of the second open space defined by the endless elastic band 434, and is dimensioned to be at least the size of the second opening 444 in the first gate member 430, which defines a smaller opening than a corresponding inner perimeter of the endless elastic band 434. The plug 453 may be a substantially smooth portion of the interior surface 452 of the second gate member 432.

In each embodiment of the sprung gates disclosed herein, the endless elastic band was illustrated as a generally smooth band having a generally rectangular cross-section as seen in FIGS. 9 and 11. The endless elastic band, however, is not limited to such a construction. In another embodiment, the endless elastic band may have a generally irregular inner and outer surface as seen in FIGS. 18 and 19. In this embodiment, the endless elastic band is generally referred to as a bellowed, endless elastic band 434, which has an undulating outer perimeter 474 and an inner perimeter 476 oppositely undulating relative thereto. When the endless elastic band 434 has the generally figure 8-shaped configuration, the cross member 435, forming the center of the eight, may also be bellowed. The bellows in the cross member 435 and the main part of the band, as shown in FIGS. 18 and 19, are oriented transverse to the direction of fluid flow through the conduit and, hence, through the endless elastic band itself. The bellowed, elastic band 434 is advantageous because it provides more even compression of the band between the first and second gate members.

As noted above, one of the benefits of many aspects of the embodiments disclosed herein is that a smaller solenoid actuator can be used to linearly translate the gate between its open and closed positions. In particular, the sprung gate embodiments disclosed herein require less than a three pound force to linearly translate the gate from a first position to a second position (open to closed or closed to open) and require little to no holding force from the solenoid actuator, i.e., just enough force to overcome the return spring force. In one embodiment, the solenoid actuator, which includes the housing it is enclosed in, but not the sprung gate assembly or the conduit, is of a size that it only weighs about 350 grams or less. In another embodiment, the solenoid actuator is of a size that it weighs about 290 grams.

Another aspect of the valve devices that allows for these smaller solenoid actuators is shown in FIG. 21. The opening 433 (as labeled in FIG. 20) in each of the first and second gate members of any embodiment herein that define the passage 229, 429 through the sprung gate is generally rectangular with a longitudinal axis C thereof oriented generally perpendicular to a longitudinal axis A of the conduit. The conduit 122 has a generally circular or oval inner dimension proximate the pocket 126, wherein the area of the opening 433 in each of the first and second gate members has approximately the same area as the generally circular or oval inner dimension of the conduit. The rectangular shape of the opening 433 provides a gate that need not travel as far to reach a fully open position or a fully closed position, which requires less power since the distance of travel is reduced. Accordingly, a smaller solenoid may be used. An opening of approximately the same area as the inner dimension of the conduit is one that has the same area or an area that is +/−5% of the area of the inner dimension of the conduit. Having approximately the same area means that the opening defining the passage through the sprung gate has approximately the same flow area of the conduit.

Referring now to FIG. 22, a valve device 500 is illustrated that is similar to the device of FIGS. 1-3 and, as such, like reference numbers represent the same or similar components. The valve device 500 includes a housing 502 containing an actuator 103 having a solenoid coil 104 and an armature 106 connectable to a valve mechanism 120 and electrically coupled to an electrical connector 109. A biasing element, a coil spring 112 in the figure, biases the armature 106 into either the open position or the closed position. The valve mechanism 120 includes a conduit 122 defining a connection opening 124 facing the armature 106 and opening into a pocket 126 for receiving a sprung gate assembly 128 that is linearly movable within the pocket 126. The pocket 126 separates the conduit 122 into a first section 122a and a second section 122b, and the ends of conduit adjacent to the pocket 126 define valve opening 123. The conduit 122 may be a tube that continuously, gradually tapers or narrows along a longitudinal axis "A" from both ends toward the valve opening 123, thereby having its smallest inner diameter at the valve opening 123 as described above.

The housing 502 includes a flange 504 for connecting the housing to the valve mechanism 120, in particular to the conduit 122. An airtight seal is desirable between these two components and is accomplished herein by spin welding the flange 504 of the housing 502 to a mating flange 506 of the conduit. The conduit includes the mating flange 504, which is a generally annular flange disposed about the connection opening 124 of the pocket 126. The flange 504 of the housing 502 may have either a generally V- or W-shaped cross-sectional profile and the mating flange 506 of the conduit 122 has the opposite profile relative thereto. For example, as shown in FIG. 22, the flange 504 of the housing 502 is a generally W-shaped cross-sectional profile and the mating flange 506 of the conduit 122 is a generally V-shaped cross-sectional profile. As such, the arms of the V-shaped profile are seated in the gaps defined by the W-shaped profile.

Once the flange 504 and mating flange 506 are mated with one another, either the housing or the conduit may be held stationary and the other component may be rotated relative thereto, with the application of pressure, 360 degrees or more to weld the components together. Here, at least the flange 504 and mating flange 506 comprise a plastic material, typically a thermoplastic material, that melt and become welded together as a result of the pressure and friction created by rotating one component relative to the other.

In embodiment, the assembly of the valve device includes a spin welding step. The method includes providing an actuator enclosed within a housing, such as housing 502, having a stem protruding from the housing and having a flange, an unassembled sprung gate, and a conduit, such as conduit 122, having a mating flange. Then, the method includes fastening the first gate member and the second gate member to one another with an endless elastic band sandwiched therebetween and with the connecting member of each gate member of the sprung gate disposed about the stem to define an assembled sprung gate. Next, the assembled sprung gate is mated with the pocket of the conduit and the flange of the housing and the mating flange of the conduit are spin welded together. The flange and mating flange may be as described above with respect to FIG. 22.

The spin welding may include providing a stationary jig shaped and configured to hold either the housing or the conduit stationary and an opposing jig or chuck that is rotatable relative to the stationary jig. The chuck is shaped and configured to hold either the housing or the conduit. In one embodiment, the stationary jig is shaped and configured to hold the housing stationary and the chuck is shaped and configured to rotate the conduit and the sprung gate together relative to the housing. The spin welding may include rotating the conduit and the assembled sprung gate at least 360 degrees relative to the housing.

Figure 23:
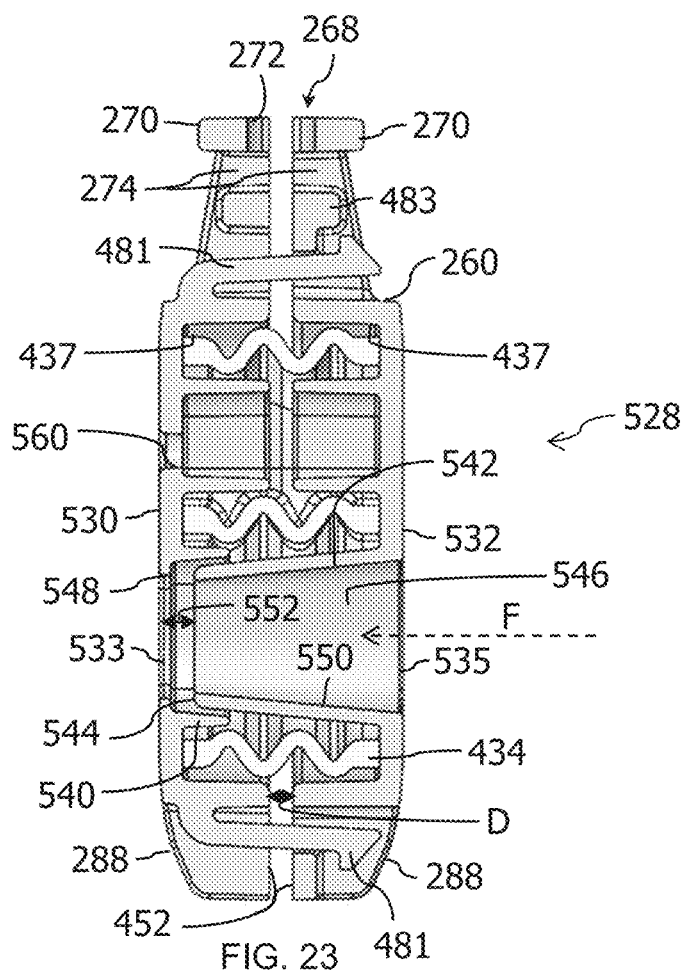
FIG. 23 is a side cross-sectional, assembled view of another embodiment of a sprung gate assembly.

Referring now to FIG. 23, a sixth embodiment of a sprung gate assembly, generally designated as reference number 528, is provided, which similarly includes a first gate member 530, a second gate member 532, and an endless elastic band 434, as described with respect to FIGS. 18 and 19 herein, received between the first and second gate members 530, 532. The endless elastic band 434 may be described as being sandwiched between the first and second gate members 530, 532 as may be any of the endless elastic bands disclosed herein. The sprung gate 528 includes a multi-part socket 268 as described above with respect to FIGS. 12-14, the numerical references for which are repeated in FIG. 23, that snaps around head 167 to permit sliding movement in multiple directions perpendicular to the path of linear movement of the sprung gate and to allow the sprung gate to rotate 360 degrees or more relative to the stem 114 during assembly. The general construction of the first and second gate members 530, 532 corresponds to the construction described with respect to FIGS. 10 and 11, except for the modifications described further below. Accordingly, the same reference numbers are included for repeat features described above with respect to other embodiments.

Figure 24:
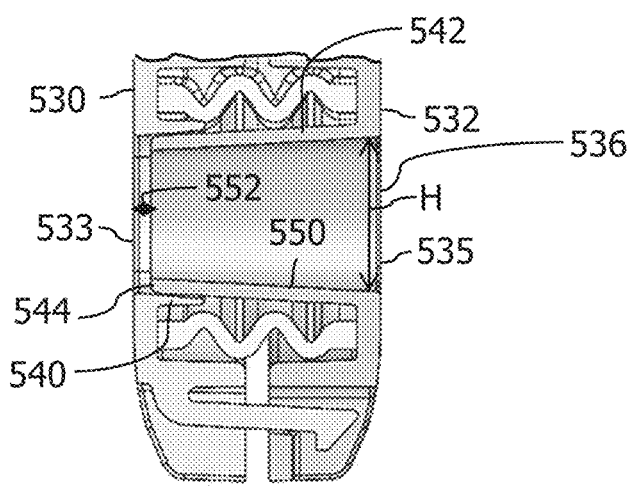
FIG. 24 is a side cross-sectional, assembled view of a variation of the sprung gate assembly of FIG. 23.

The sprung gate 528 has an endless elastic band 434 having an inner perimeter defining at least a first open space, a first gate member 530 defining a first opening 533 therethrough that has a flange 540 oriented parallel to and extending in a direction opposite to a flow direction F through the sprung gate, and a second gate member 532 defining a second opening 535 therethrough that has an elongate throat 542 extending therefrom toward the first gate member 530 with its terminus or distal end 544 seated within the flange 540 of the first gate member, thereby defining a continuous passage 546 through the sprung gate 528. The endless elastic band 434 is sandwiched between the first and second gate members 530, 532 with the open space thereof receiving the continuous passage 546 defined by the elongate throat 542 and the annular flange 540 and spaces the first gate member 530 a distance apart D from the second gate member 532. As illustrated, flange 540 is a continuous flange that generally matches the shape of the first opening 533. Both the first gate member 530 and the second gate member 532 include a track 437 as a portion of or recessed into an interior surface 452 thereof in which a portion of the endless elastic band 434 is seated. The first and second gate members 530, 532 include a fastener system such as those described above. In FIGS. 23-24, the fastener system is illustrated as including latches 481.

The elongate throat 542 is present to solve the problem of debris ingress in between moving and stationary surfaces of the sprung gate with minimal to no reduction in the flow capacity of the sprung gate. The elongate throat defines a gradually, continuously tapering interior passageway 550. The tapering interior passageway 550 reduces in dimension gradually, continuously toward its terminus or distal end 544. The elongate throat 542 has a length that is smaller than the distance from the exterior surface of the first gate member to an exterior surface of the second gate member, thereby defining the clearance gap 552 labeled in FIG. 23. The clearance gap 552 is about 0.1 mm up to about 2.0 mm, but also may be determined by being at least 0.5 mm less than the length of the flange 540. As illustrated in FIG. 23, the first gate member 530 may include a lip 548 within the first opening 533 that is oriented transverse to the flow direction and, when present, the clearance gap 552 may be about 0.6 mm to about 1.5 mm. Turning to FIG. 24, the sprung gate may omit the lip 548 within the first opening 533 and, when omitted, the clearance gap 552 may be about 0.1 mm to about 2.0 mm.

Figure 25A:
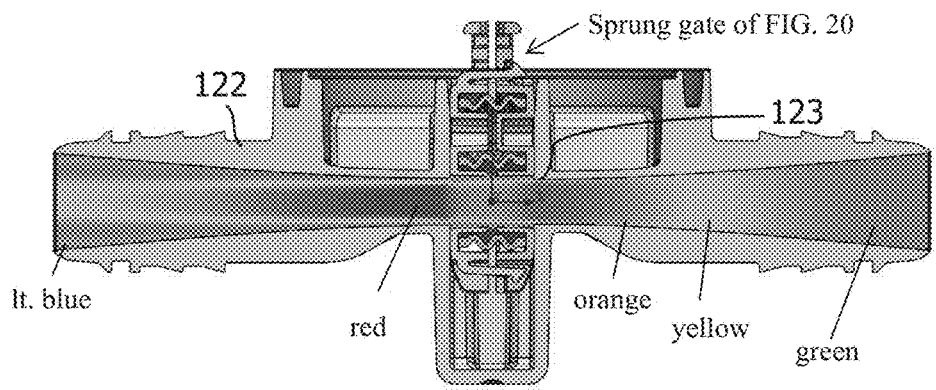
FIGS. 25 A-C are flow analysis diagrams comparing the sprung gate assemblies of FIGS. 22, 23, and 24.
Figure 25B:
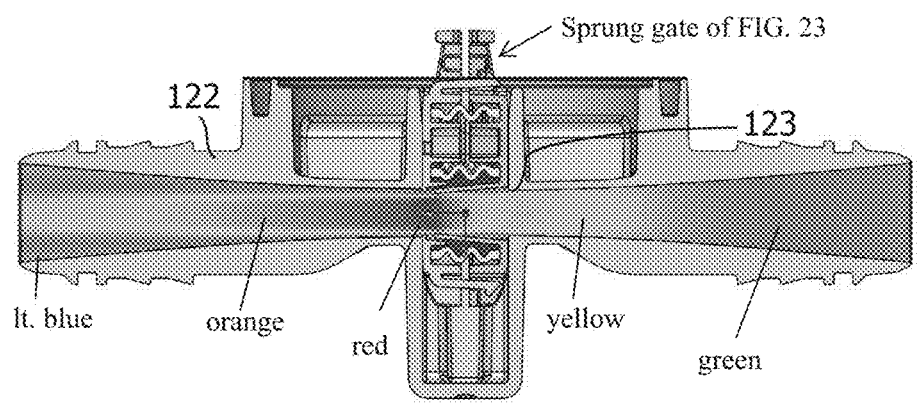
Figure 25C:
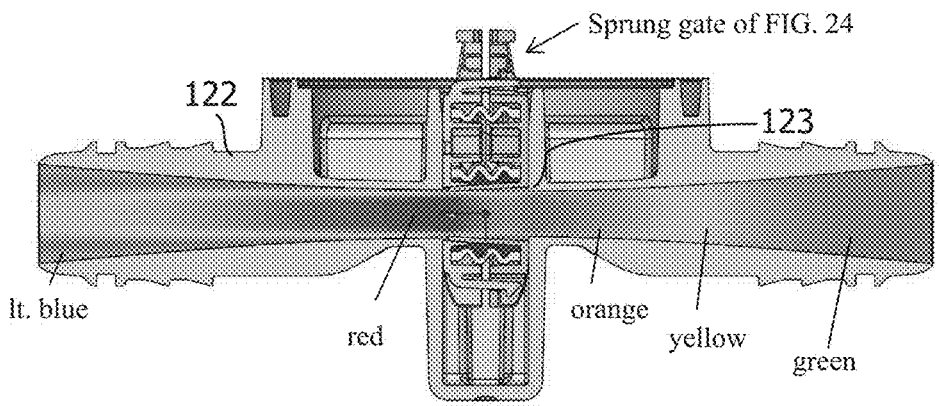

Referring now to FIGS. 25A-25C, comparative simulations of the flow through the sprung gate of FIG. 20, FIG. 23, and FIG. 24 are provided. Red designates the fastest flow within the conduit through the sprung gate, and light blue represents the slowest flow within the conduit. FIG. 25A had a flow of 9.8 g/s. FIG. 25B had a flow of 9.0 g/s. FIG. 25C had a flow of 10.1 g/s. Accordingly, the continuous passages of the sprung gates illustrated in FIGS. 23 and 24 have comparable flow to that of FIG. 20, and the sprung gate of FIG. 24 even experienced an improvement of 0.3 g/s. As such, these alternate embodiments can reduce debris ingress without sacrificing performance of the valve.

With reference to FIG. 24, the tapering interior passageway 550 has a two-fold purpose; it enables the easy removal of the part from the forming tool, and it ensures that when the gate 528 is in the flow condition that the flow entrance 536 does not interfere with the flow. Given the amount of travel of the gate 528, the continuous gradual taper of the tapering interior passageway 550 is such that the opening height H at the flow entrance 536 is about 0.1 mm to about 0.5 mm greater than the worst case travel of the gate. As seen in FIGS. 25B and 25C, the opening height H is larger than the portion of the valve opening 123 of the conduit 122 that is most proximate thereto.

Another difference in the sprung gate 528 of FIG. 23 compared to the prior figures is that the first gate member 530 defines a third opening 560 therethrough in a closed position portion thereof. The third opening 560 serves to pressurize the interior region of the gate that it communicates with when the gate is in the closed position and boost pressure is present in the portion of the conduit 122 most proximate thereto. This pressurization of the interior region of the gate serves to ensure adequate sealing of the valve while maintaining the force to actuate the gate at a constant value due to friction. The area of the third opening 560 compared to the first opening 533 is in a range of about 1:1 to about 1:10, more preferably in a range of about 1:3 to about 1:5. Here, any of the first, second, and third openings may be generally rectangular with a longitudinal axis thereof oriented generally perpendicular to the flow direction, but are not limited thereto.

The sprung gates of FIGS. 23 and 24 are illustrated as having a generally figure 8-shaped endless elastic band. The endless elastic band is a bellowed elastic band with the bellows oriented transverse to the direction of flow therethrough.

The sprung gates disclosed in FIGS. 9 and 11 are illustrated as having a generally smooth endless elastic band. The endless elastic band, however, is not limited to such a construction. The endless elastic band may have a generally irregular inner and outer surface as seen in FIGS. 18 and 19. In this embodiment, the endless elastic band is generally referred to as a bellowed, endless elastic band 434, which has an undulating outer perimeter 474 and an inner perimeter 476 oppositely undulating relative thereto. When the endless elastic band 434 has the generally figure 8-shaped configuration, the cross member 435, forming the center of the eight, may also be bellowed. The bellows in the cross member 435 and the main part of the band, as shown in FIGS. 18 and 19, are oriented transverse to the direction of fluid flow through the conduit and, hence, through the endless elastic band itself. The bellowed, elastic band 434 is advantageous because it provides more even compression of the band between the first and second gate members.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader, and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A sprung gate for a valve comprising:
   an endless elastic band having an inner perimeter defining an open space; and
   a first gate member defining a first opening therethrough, the first opening having an annular flange oriented parallel to and extending in a direction opposite to a flow direction through the sprung gate; and
   a second gate member defining a second opening therethrough, the second opening having an elongate throat extending therefrom toward the first gate member;
   wherein a terminus of the elongate throat is seated within the annular flange of the first gate member, thereby defining a continuous passage through the sprung gate;
   wherein the endless elastic band is sandwiched between the first and second gate members with the open space thereof receiving the continuous passage defined by the elongate throat and the annular flange and spaces the first gate member a distance apart from the second gate member.

2. The sprung gate of claim 1, wherein the elongate throat defines a gradually, continuously tapering interior passageway.

3. The sprung gate of claim 1, wherein the elongate throat has a length smaller than a distance from an exterior surface of the first gate member to an exterior surface of the second gate member, thereby defining a clearance gap at the terminus of the elongate throat.

4. The sprung gate of claim 3, wherein the clearance gap is at least 0.5 mm less than a length of the annular flange.

5. The sprung gate of claim 3, wherein the first opening of the first gate member further comprises a lip oriented transverse to the flow direction and the clearance gap is about 0.6 mm to about 1.5 mm.

6. The sprung gate of claim 1, wherein the endless elastic band is generally figure 8-shaped.

7. The sprung gate of claim 6, wherein the endless elastic band is a bellowed elastic band.

8. The sprung gate of claim 7, wherein the bellows are oriented transverse to the direction of flow therethrough.

9. The sprung gate of claim 1, wherein the first and second gate members each include a connecting member protruding from a trailing end thereof that together collectively define a multi-part socket, wherein the multi-part socket allows the sprung gate to rotate 360 degrees or more about its central longitudinal axis.

10. The sprung gate of claim 1, wherein the first and second gate members each include a track in which the endless elastic band is seated.

11. The sprung gate of claim 1, wherein the first gate member defines a third opening therethrough in a closed position portion thereof, the third opening being smaller than the first opening.

12. The sprung gate of claim 11, wherein the ratio of the area of the third opening to the first opening is in a range of about 1:1 to about 1:10.

13. The sprung gate of claim 1, wherein the first opening and the second opening are generally rectangular with a longitudinal axis thereof oriented generally perpendicular to the flow direction.

14. A valve device comprising:
   a valve mechanism comprising a conduit separated into a first section and a second section by a pocket having a sprung gate of claim 1 seated therein;
   an actuator connected to the sprung gate;
   wherein the actuator moves the sprung gate linearly within the pocket between an open position and a closed position relative to the conduit.

15. The valve device of claim 14, wherein the endless elastic band is generally oval-shaped or is generally figure 8-shaped.

16. The valve device of claim 15, wherein the endless elastic band is a bellowed elastic band with bellows oriented transverse to the direction of flow therethrough.

17. The valve device of claim 14, wherein the elongate throat of the sprung gate has a length smaller than a distance from an exterior surface of the first gate member to an exterior surface of the second gate member, thereby defining a clearance gap at the terminus of the elongate throat.

18. The valve device of claim 17, wherein the clearance gap is at least 0.5 mm less than a length of the annular flange.

19. The valve device of claim 14, wherein the first opening and the second opening are generally rectangular with a longitudinal axis thereof oriented generally perpendicular to a longitudinal axis of the conduit, and the conduit has a generally circular or oval inner dimension proximate the pocket, wherein the area of the first opening and the second opening has approximately the same area as the generally circular or oval inner dimension of the conduit.

* * * * *